(12) United States Patent
Kim et al.

(10) Patent No.: US 10,187,902 B2
(45) Date of Patent: Jan. 22, 2019

(54) METHOD AND APPARATUS FOR PERFORMING DEVICE-TO-DEVICE DIRECT COMMUNICATION BETWEEN DEVICES IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR); Daewon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/118,822

(22) PCT Filed: Feb. 13, 2015

(86) PCT No.: PCT/KR2015/001482
§ 371 (c)(1),
(2) Date: Aug. 12, 2016

(87) PCT Pub. No.: WO2015/122718
PCT Pub. Date: Aug. 20, 2015

(65) Prior Publication Data
US 2017/0055280 A1     Feb. 23, 2017

Related U.S. Application Data

(60) Provisional application No. 61/940,304, filed on Feb. 14, 2014, provisional application No. 61/945,818, filed on Feb. 27, 2014.

(51) Int. Cl.
*H04W 72/12*     (2009.01)
*H04W 72/04*     (2009.01)
(Continued)

(52) U.S. Cl.
CPC ... *H04W 72/1278* (2013.01); *H04W 72/0406* (2013.01); *H04W 74/08* (2013.01); *H04W 76/14* (2018.02); *H04W 92/18* (2013.01)

(58) Field of Classification Search
CPC combination set(s) only.
See application file for complete search history.

(56) References Cited

U.S. PATENT DOCUMENTS

2014/0064203 A1   3/2014   Seo et al.
2015/0110038 A1   4/2015   Yang et al.
(Continued)

FOREIGN PATENT DOCUMENTS

WO   WO 2012/128505 A2   9/2012
WO   WO 2013/191518 A1   12/2013

OTHER PUBLICATIONS

CATT, "Discussion on physical channel types for D2D communication", R1-135092, 3GPP TSG RAN WG1 Meeting #75, San Francisco, USA, Nov. 11-15, 2013, pp. 1-3.
(Continued)

*Primary Examiner* — Kouroush Mohebbi
(74) *Attorney, Agent, or Firm* — Birch, Stewart, Kolasch & Birch, LLP

(57) ABSTRACT

The present invention relates to a method and apparatus for performing a D2D communication between device-to-device (D2D) devices in a wireless communication system in which a D2D direct communication is supported performed by a D2D transmission user equipment (UE), and the method includes transmitting control information related to a scheduling assignment through a D2D frame defined for the D2D communication to a D2D reception UE, and transmitting D2D data to the D2D reception UE through the D2D frame, wherein the D2D frame includes a contention period in which the control information is transmitted and a D2D data period in which the D2D data is transmitted, and
(Continued)

wherein the contention period is located in front of the D2D data period.

15 Claims, 29 Drawing Sheets

(51) Int. Cl.
*H04W 74/08* (2009.01)
*H04W 92/18* (2009.01)
*H04W 76/14* (2018.01)

(56) References Cited

U.S. PATENT DOCUMENTS

2015/0312821 A1* 10/2015 Yamazaki ............. H04W 76/14
 370/338
2016/0330754 A1* 11/2016 Martin ................. H04W 72/12

OTHER PUBLICATIONS

CATT, "Resource allocation for D2D communication", R1-135094, 3GPP TSG RAN WG1 Meeting #75, Guangzhou, China, Oct. 7-11, 2013, pp. 1-4.
Ericsson, "Frame Structure for D2D-Enabled LTE Carriers", R1-140775, 3GPP TSG RAN WG1 Meeting #76, Prague, Czech Republic, Feb. 10-14, 2014, pp. 1-3.

* cited by examiner

[FIG. 1]
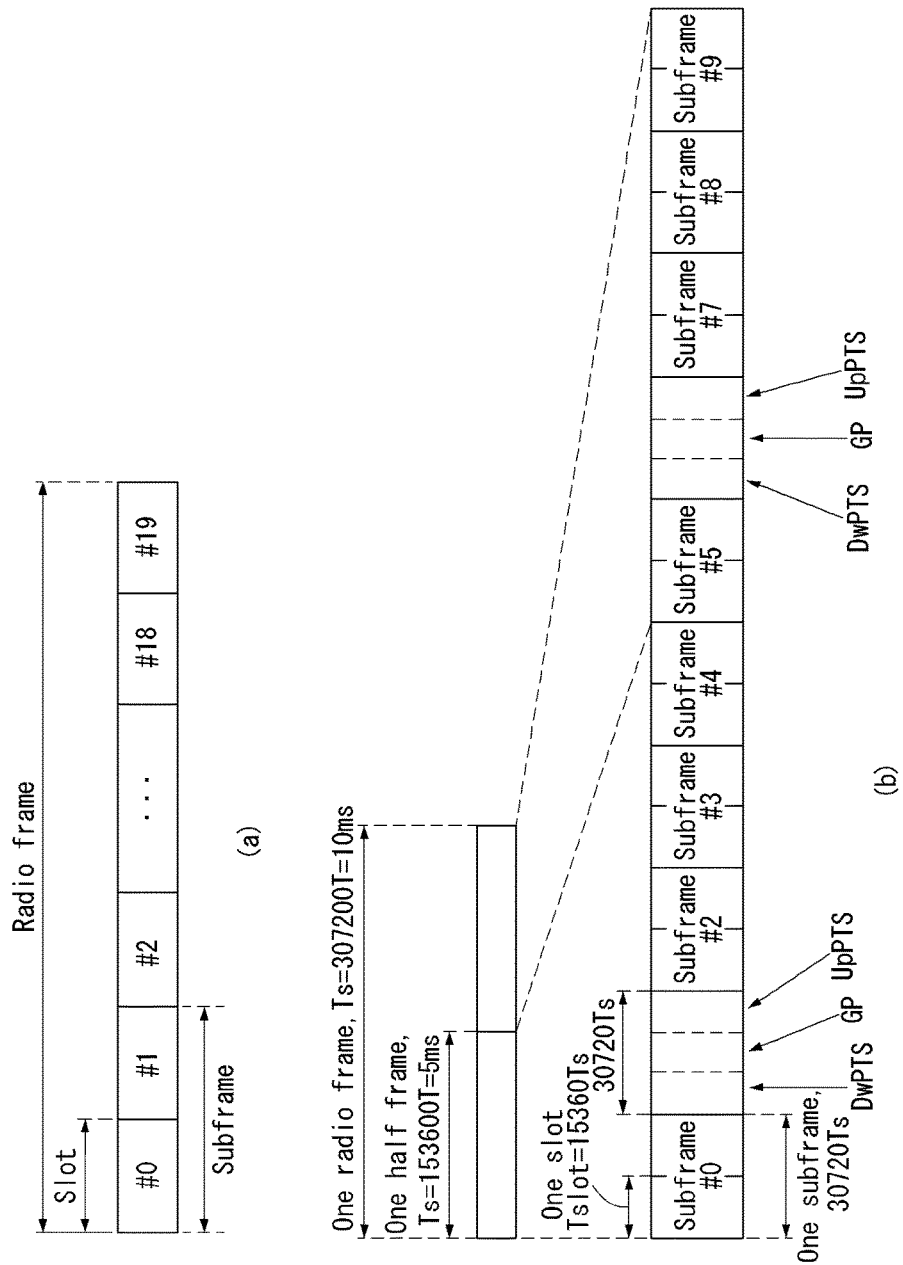

[FIG. 2]
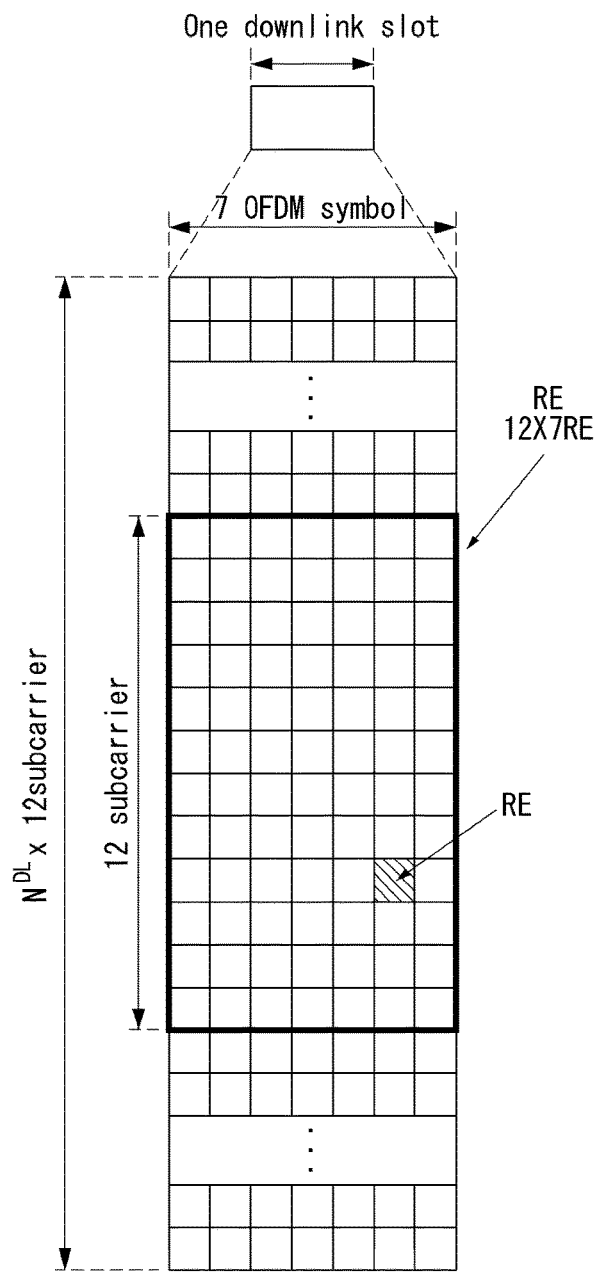

[FIG. 3]
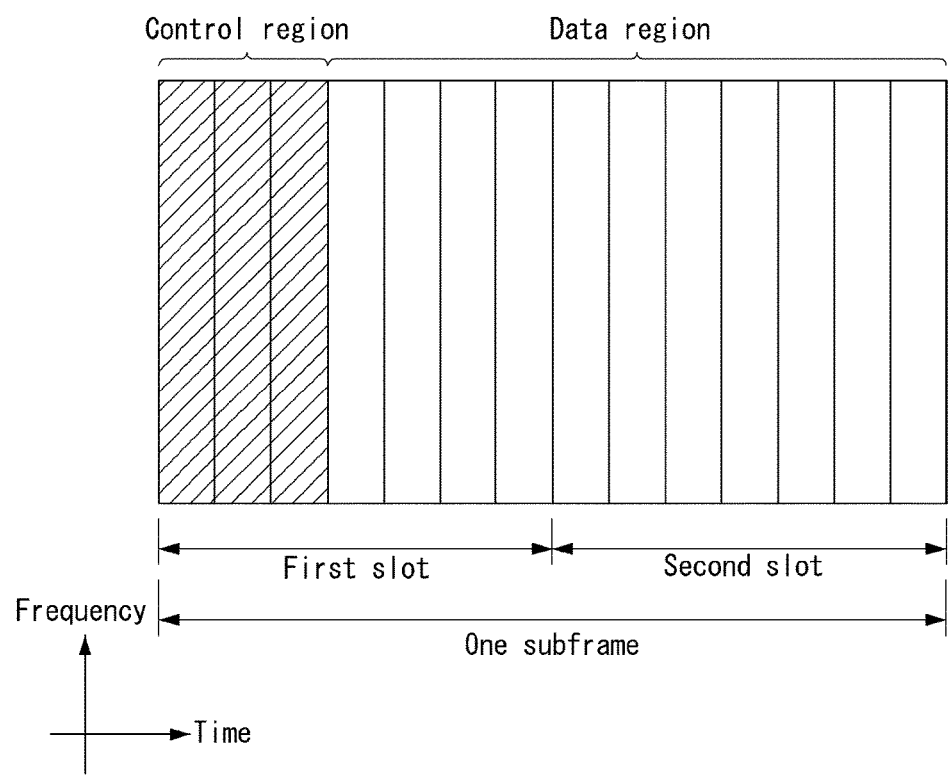

[FIG. 4]
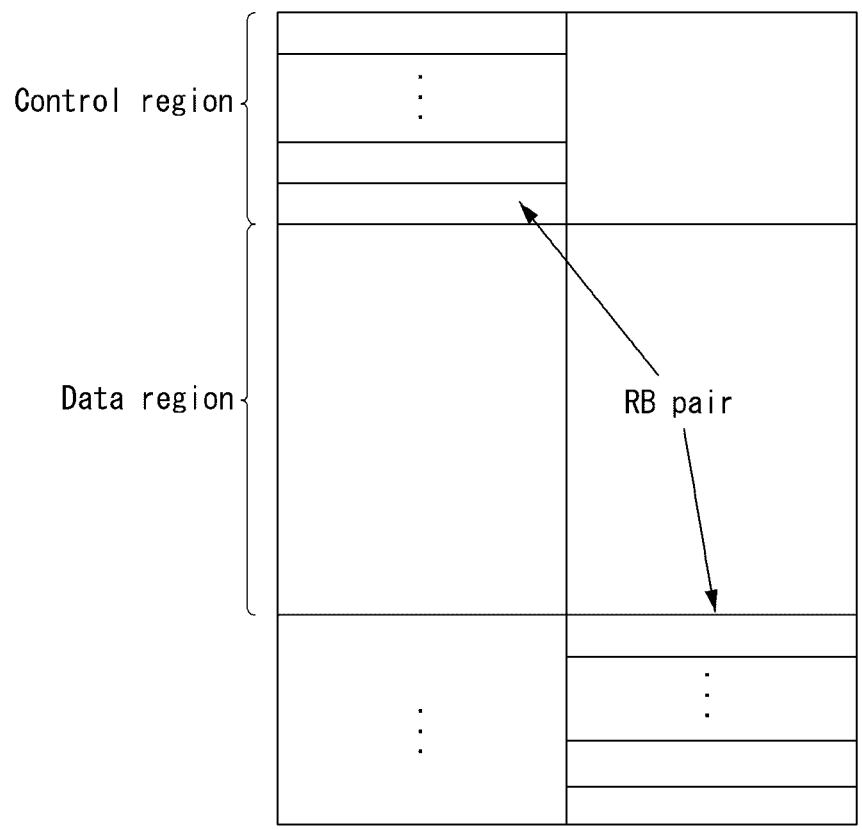

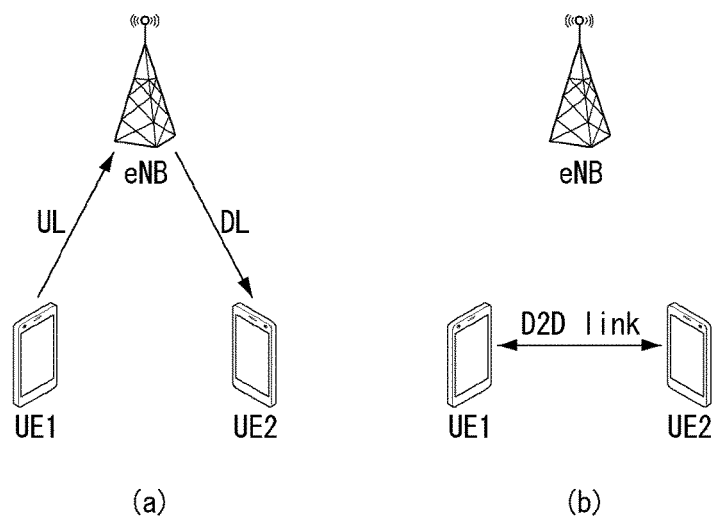
[FIG. 5]

[FIG. 6]
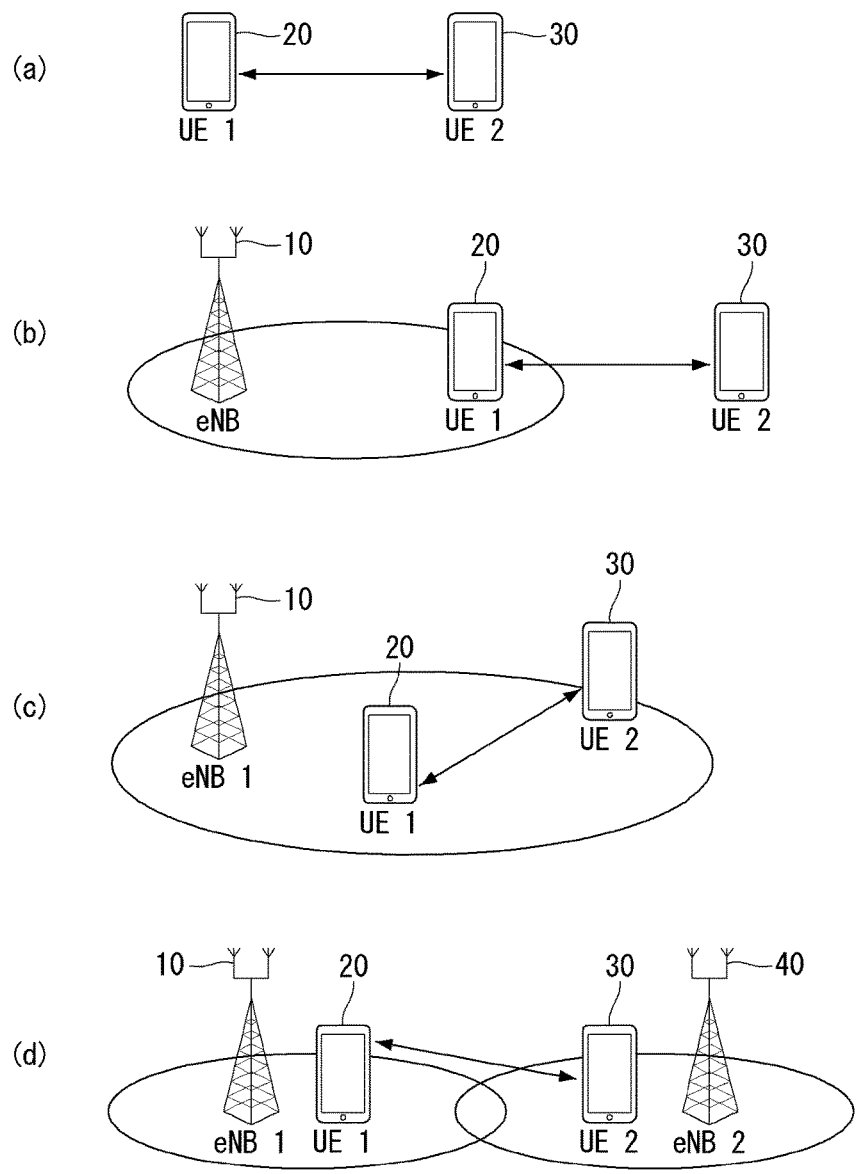

[FIG. 7]
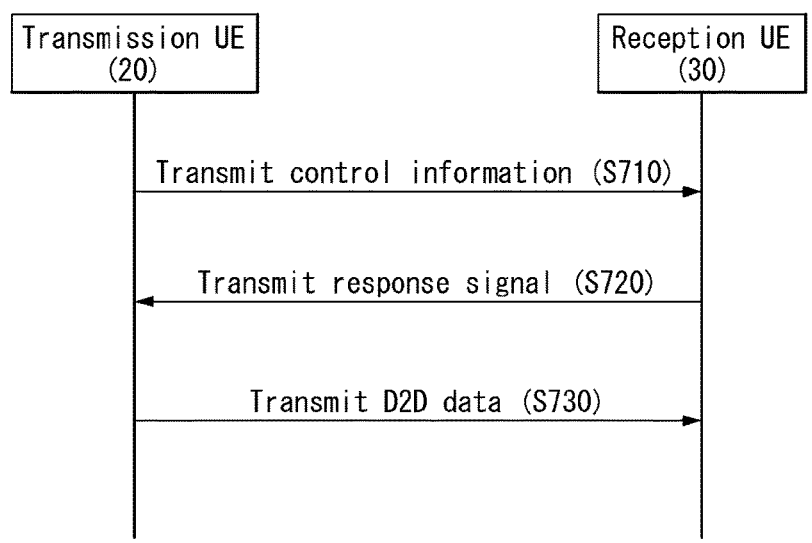

[FIG. 8a]
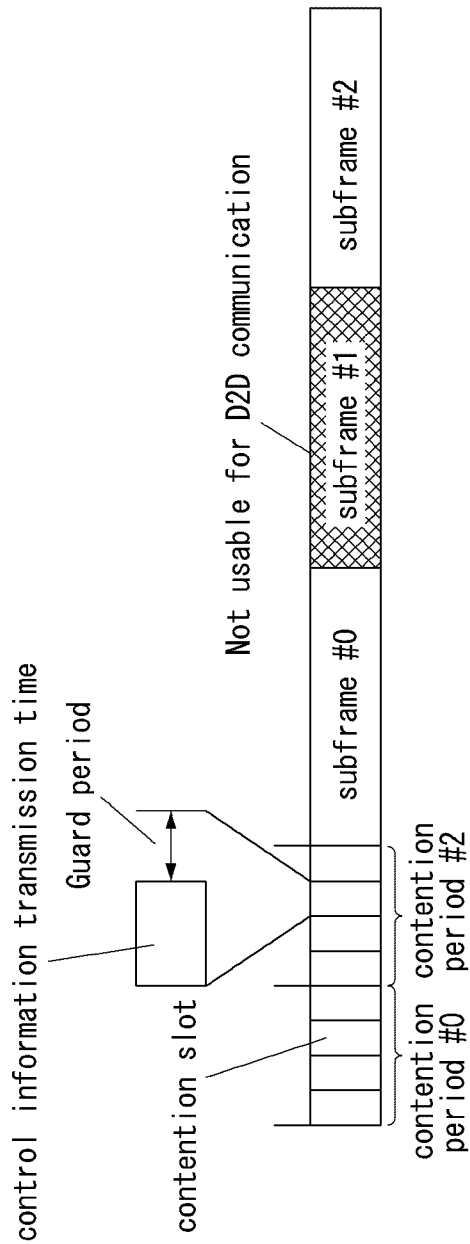

[FIG. 8b]
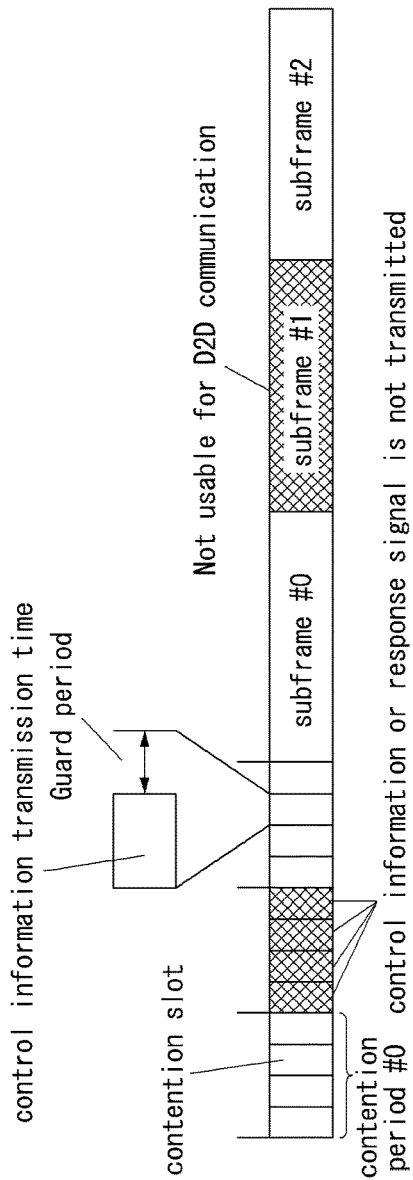

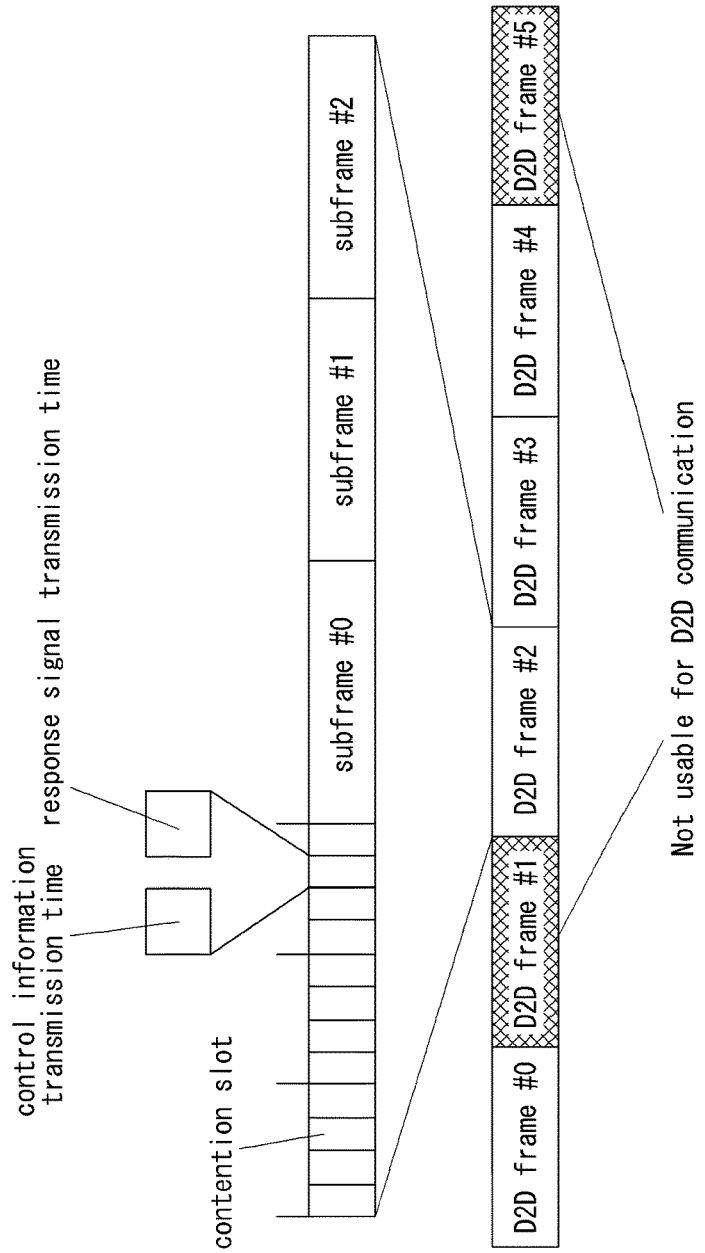
[FIG. 8c]

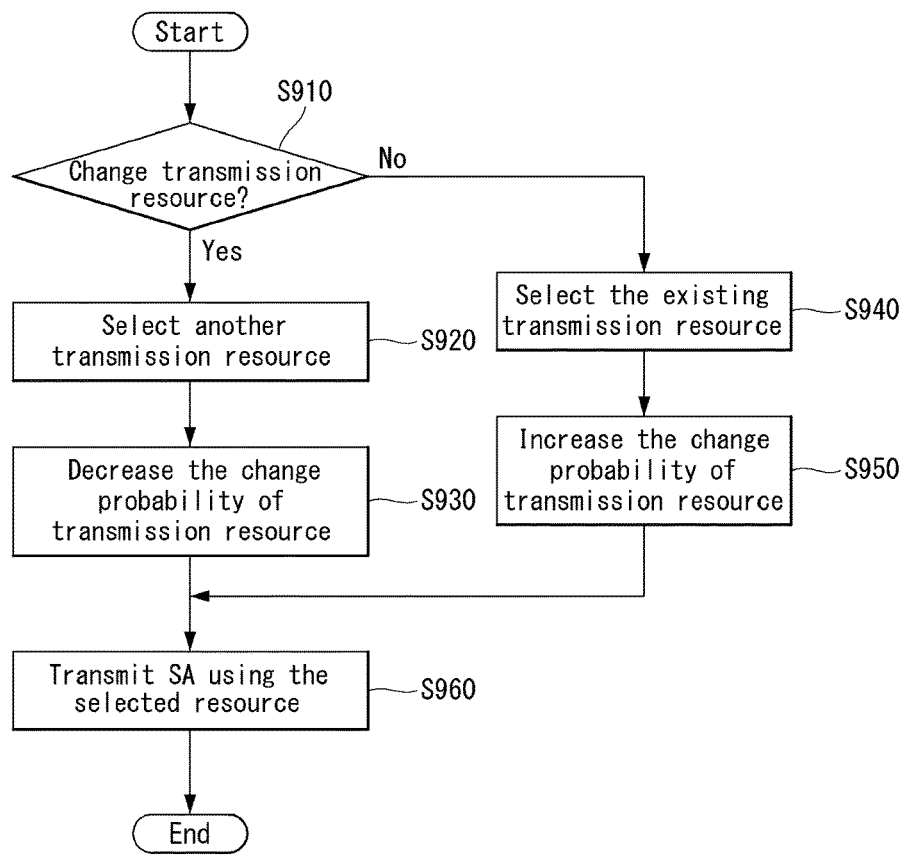
[FIG. 9]

[FIG. 10]
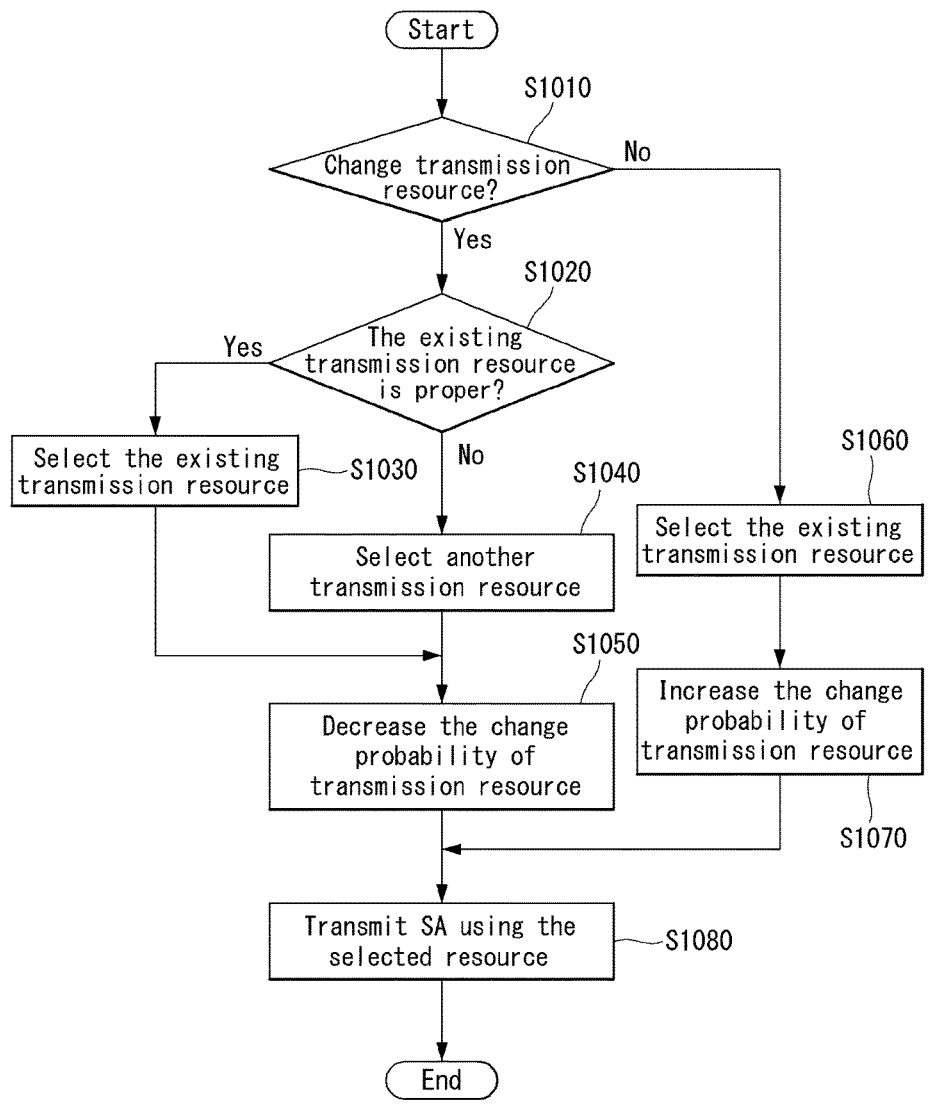

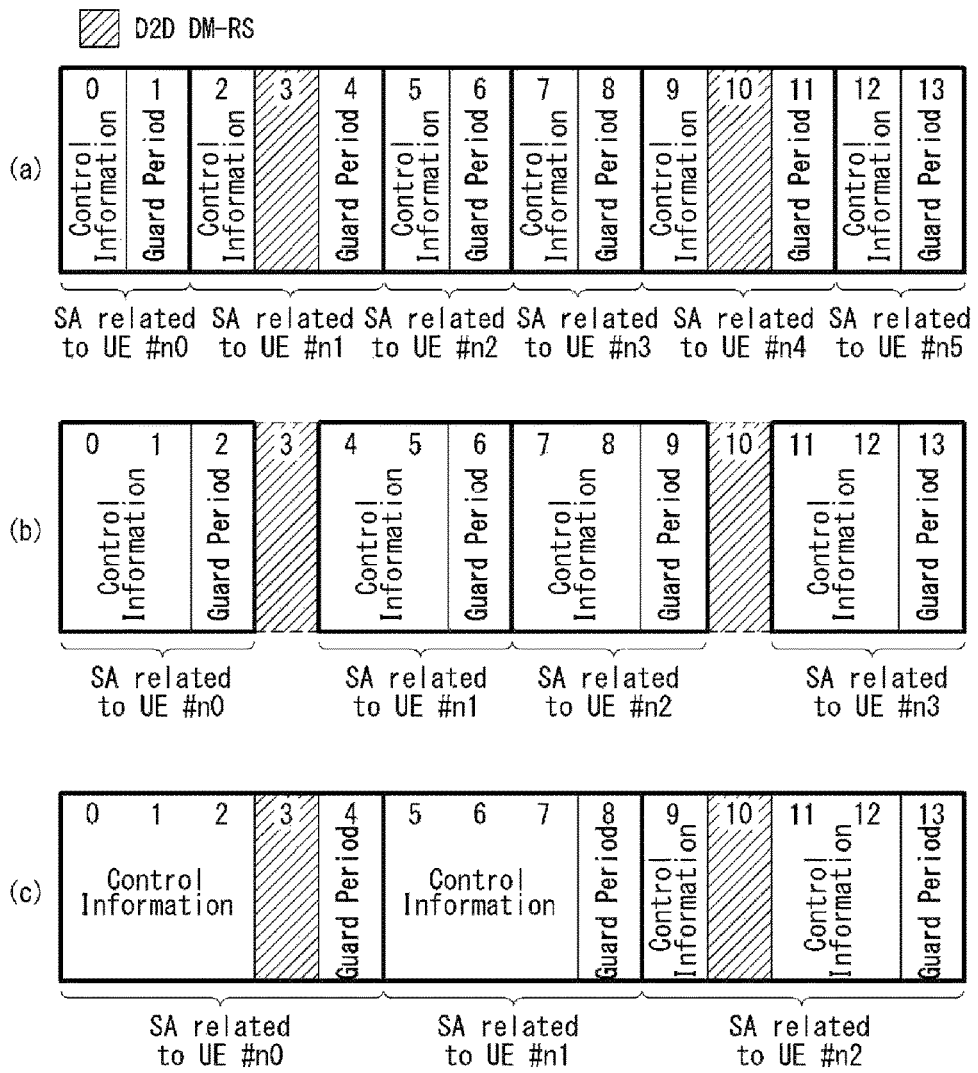

[FIG. 11b]
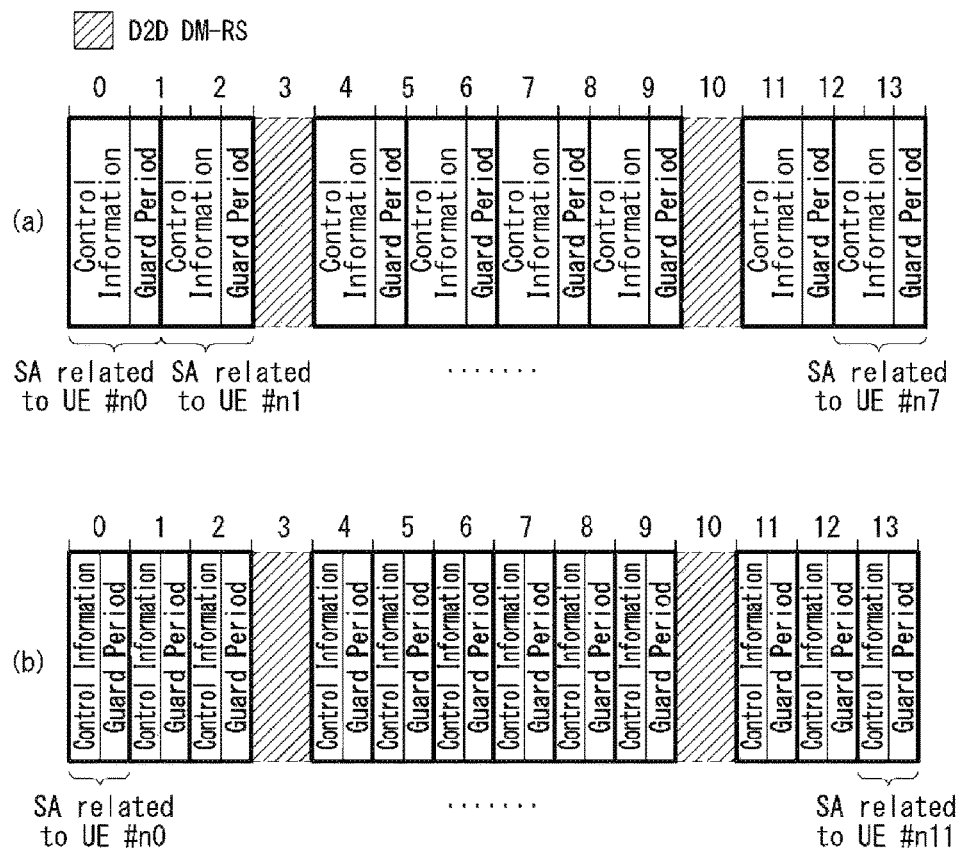

[FIG. 11c]
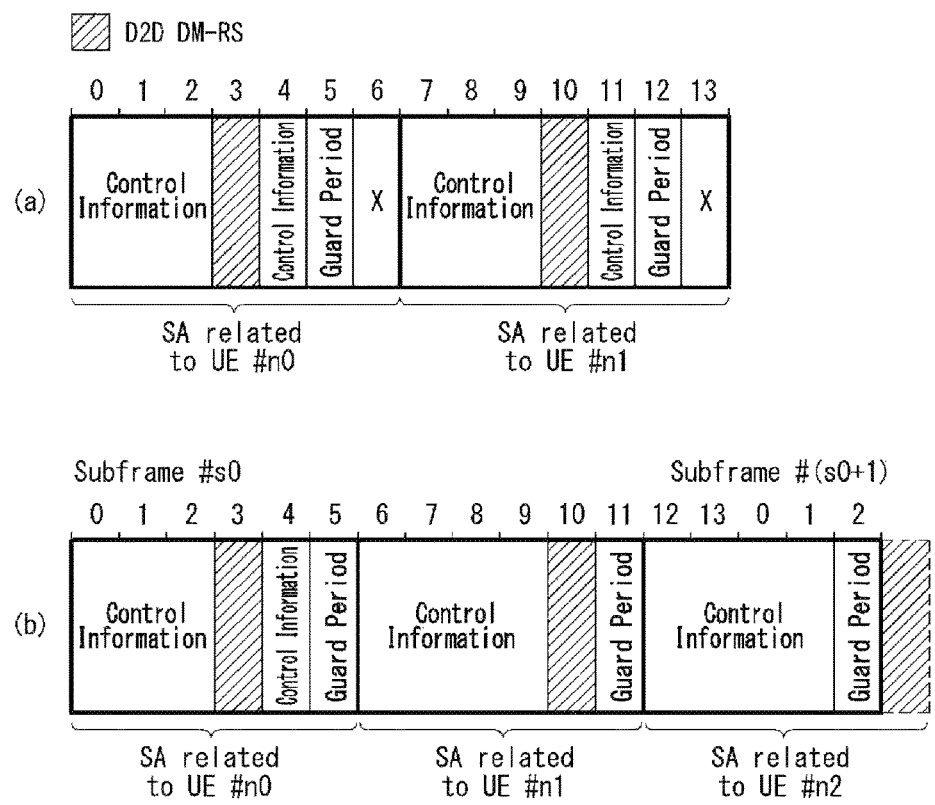

[FIG. 12]
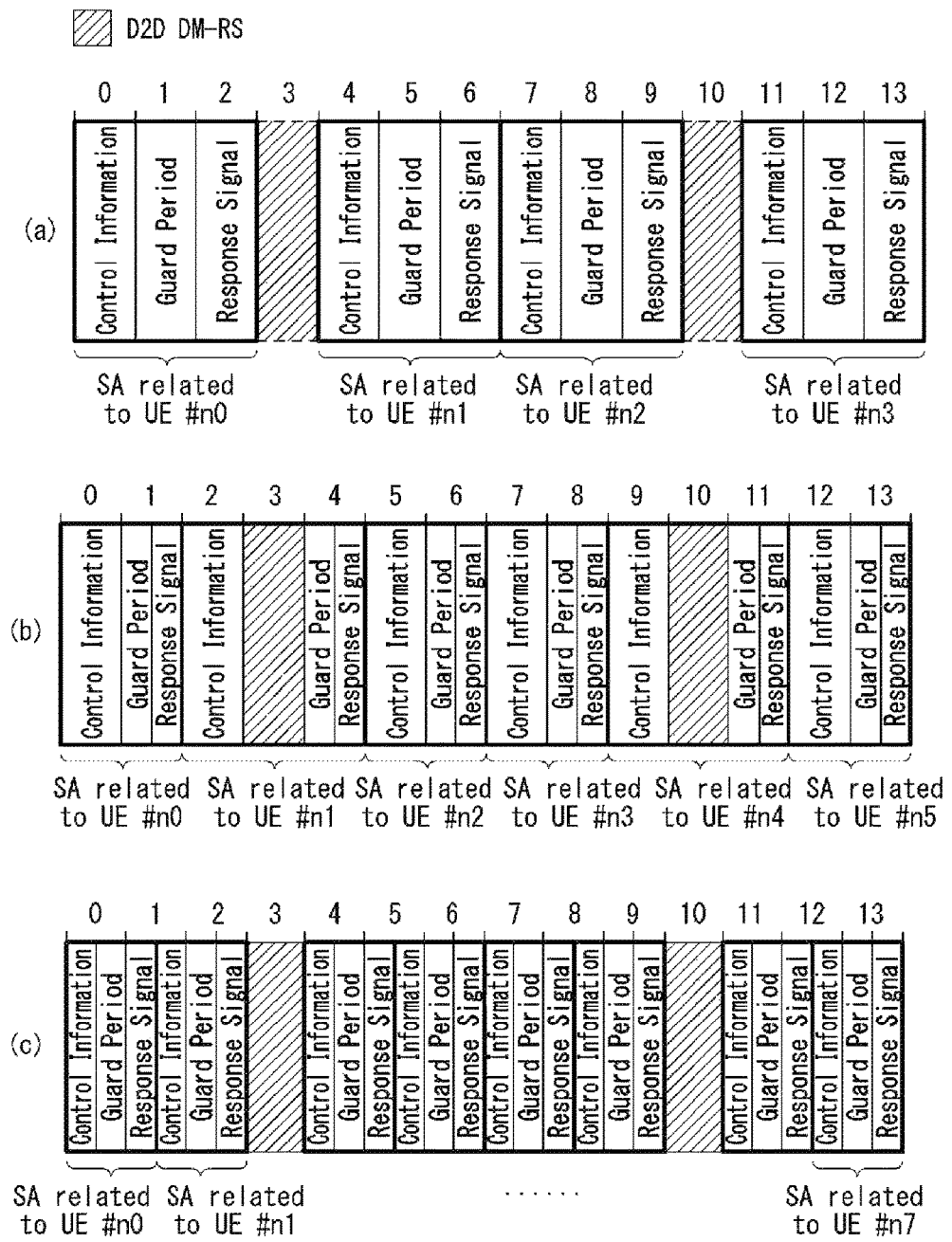

[FIG. 13]
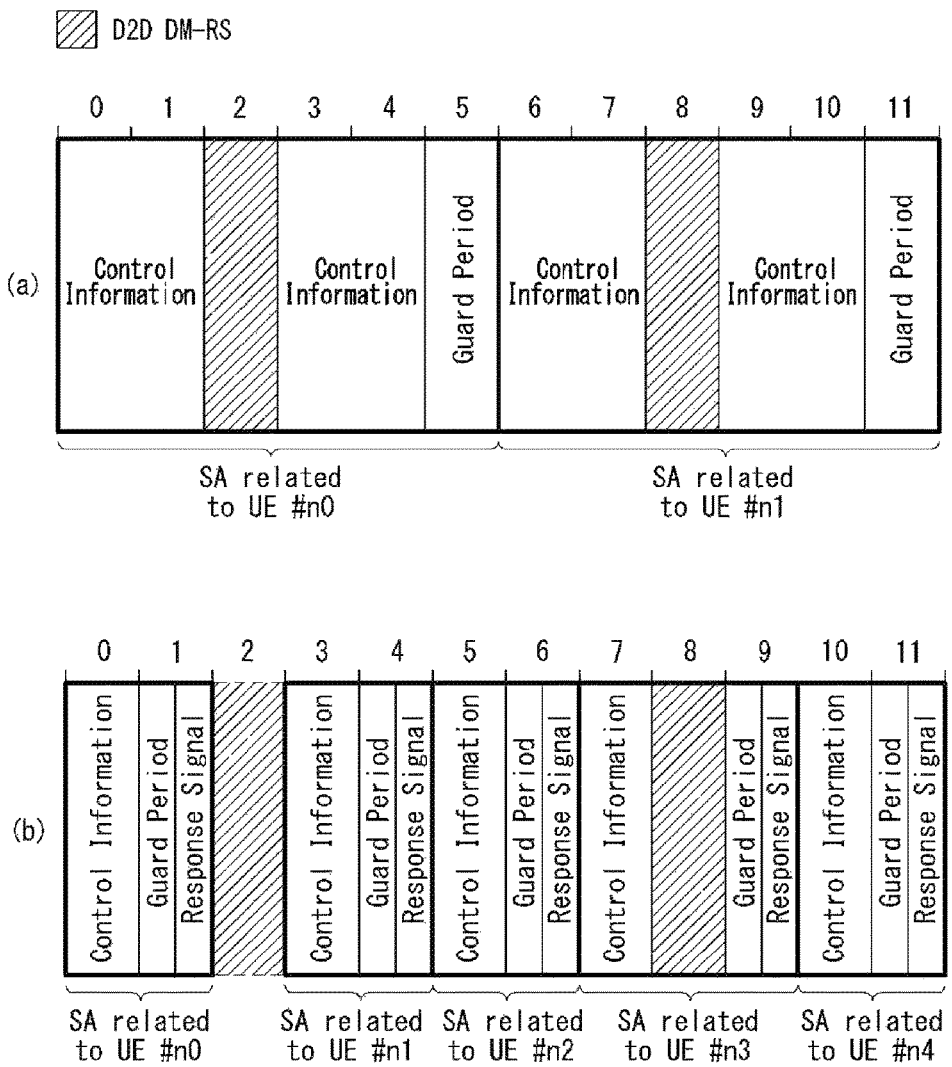

[FIG. 14]
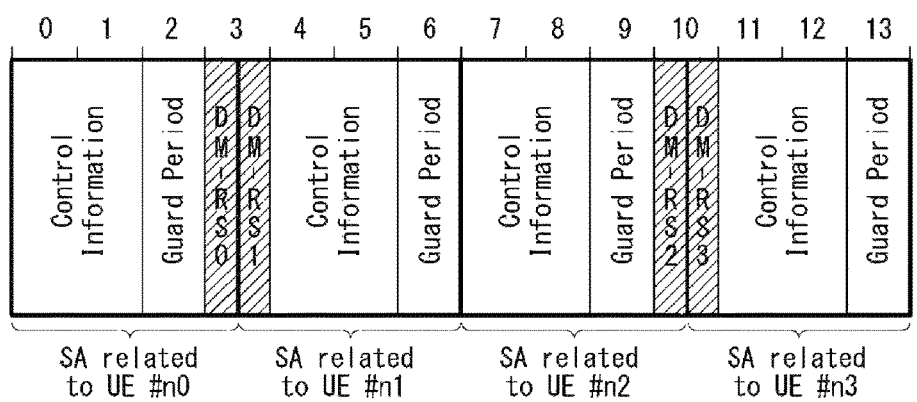

[FIG. 15]
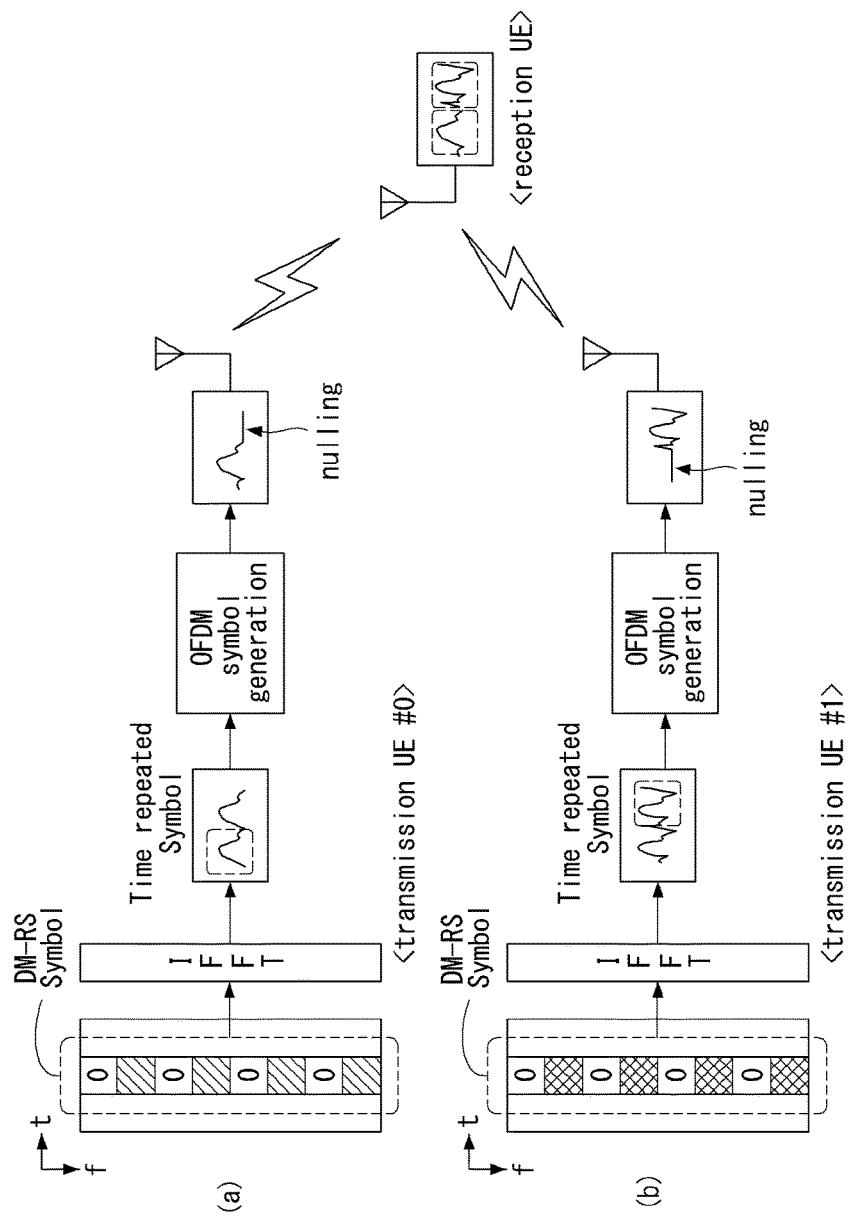

[FIG. 16]
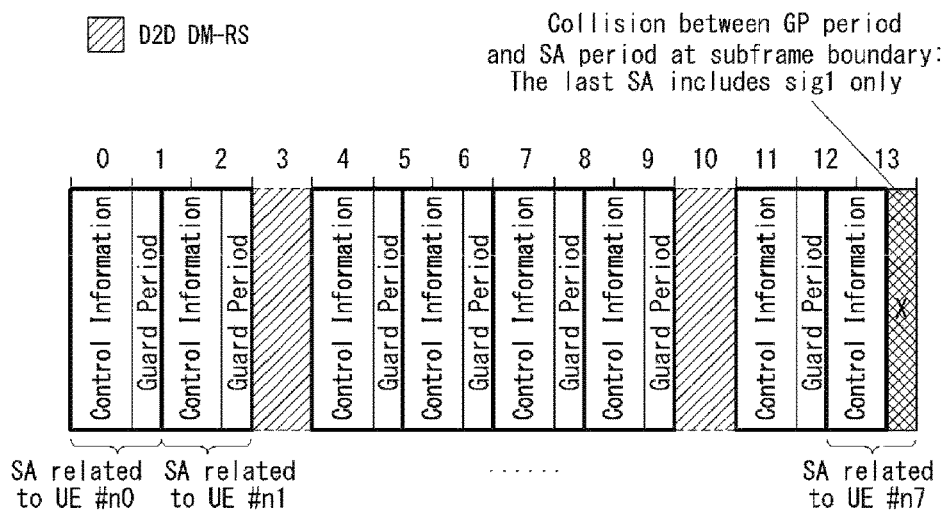

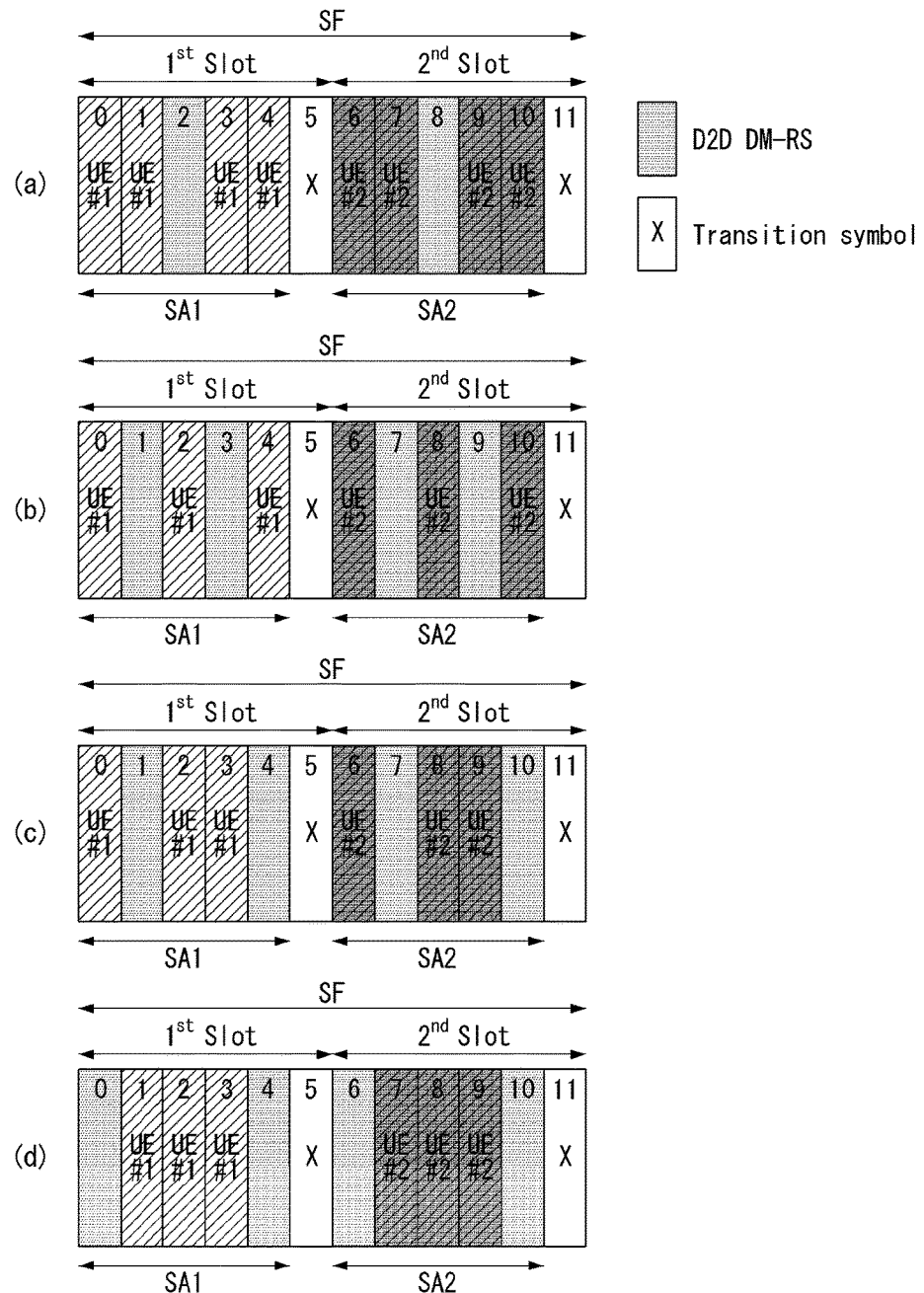
[FIG. 17]

[FIG. 18]
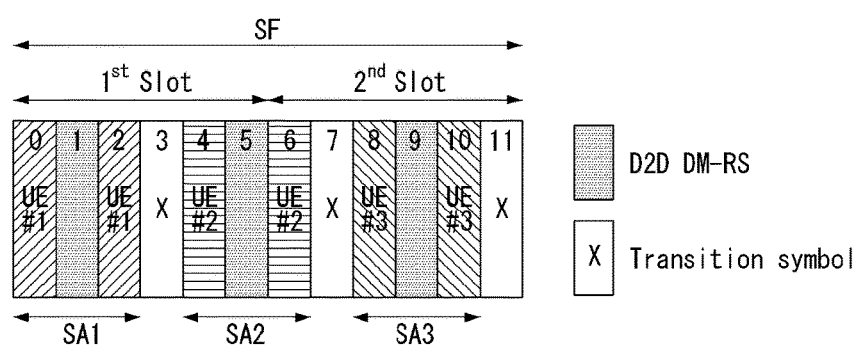

[FIG. 19]
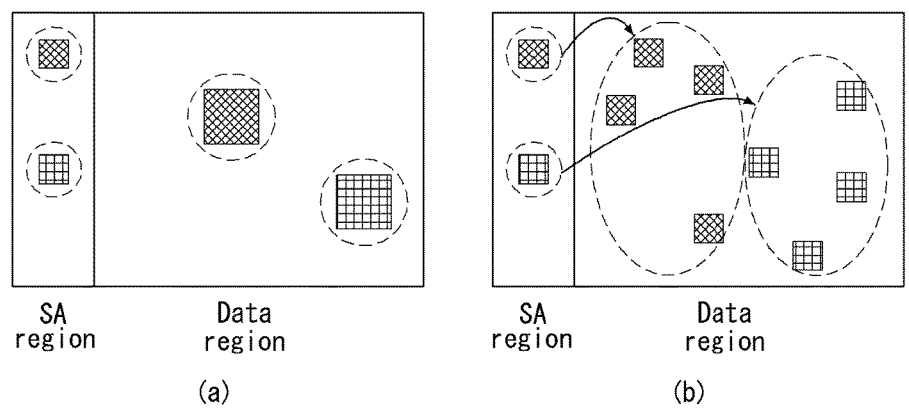

[FIG. 20]
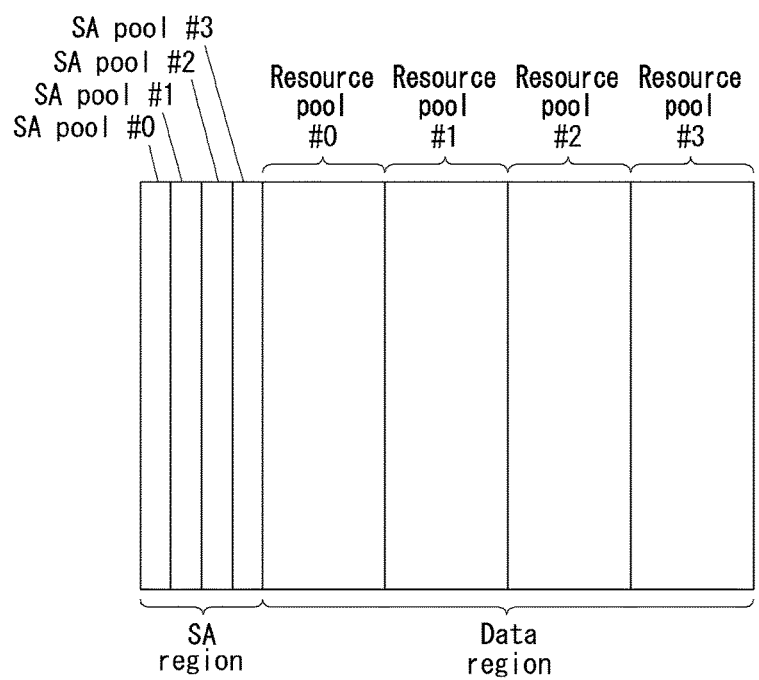

[FIG. 21]
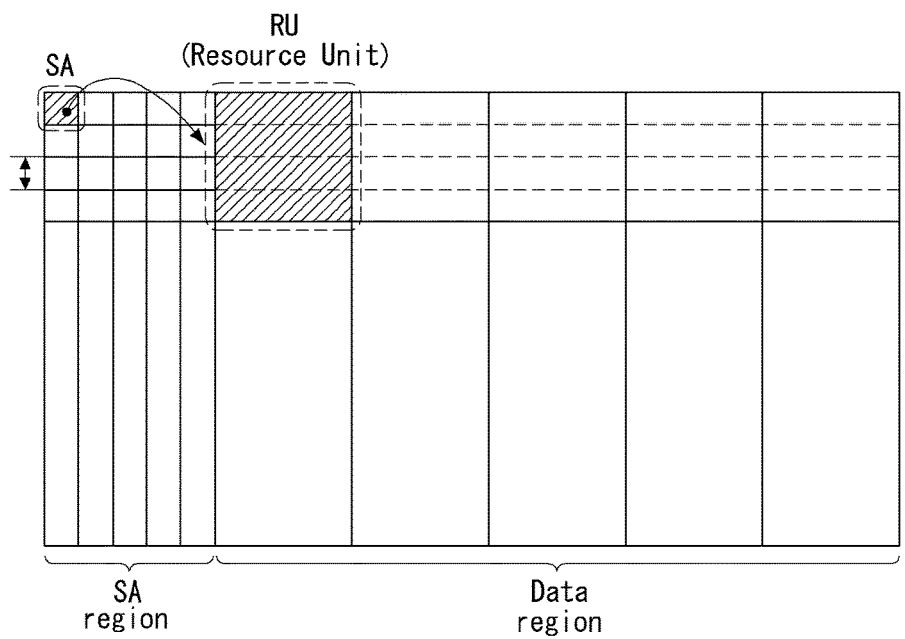

[FIG. 22]
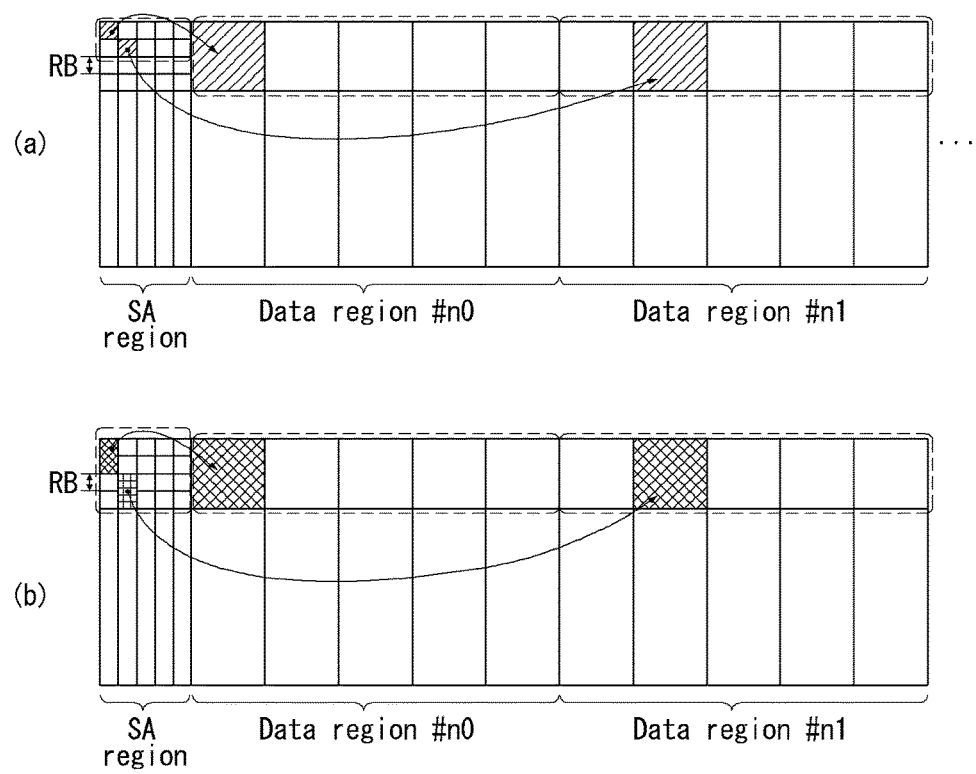

[FIG. 23a]
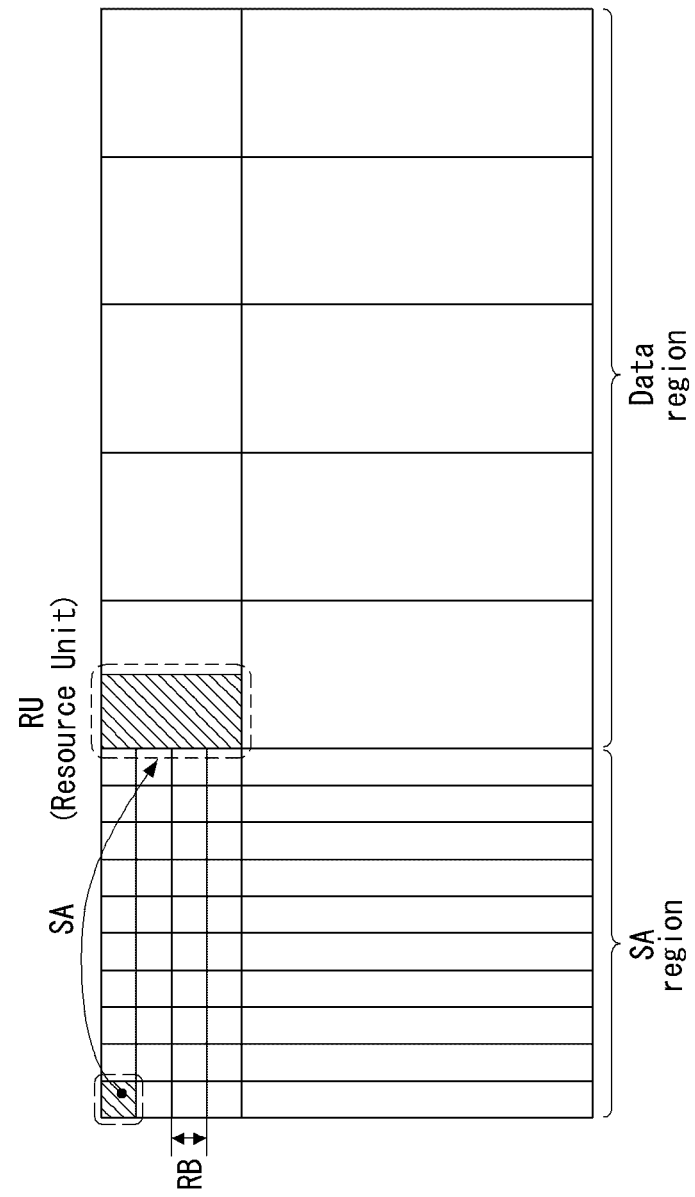

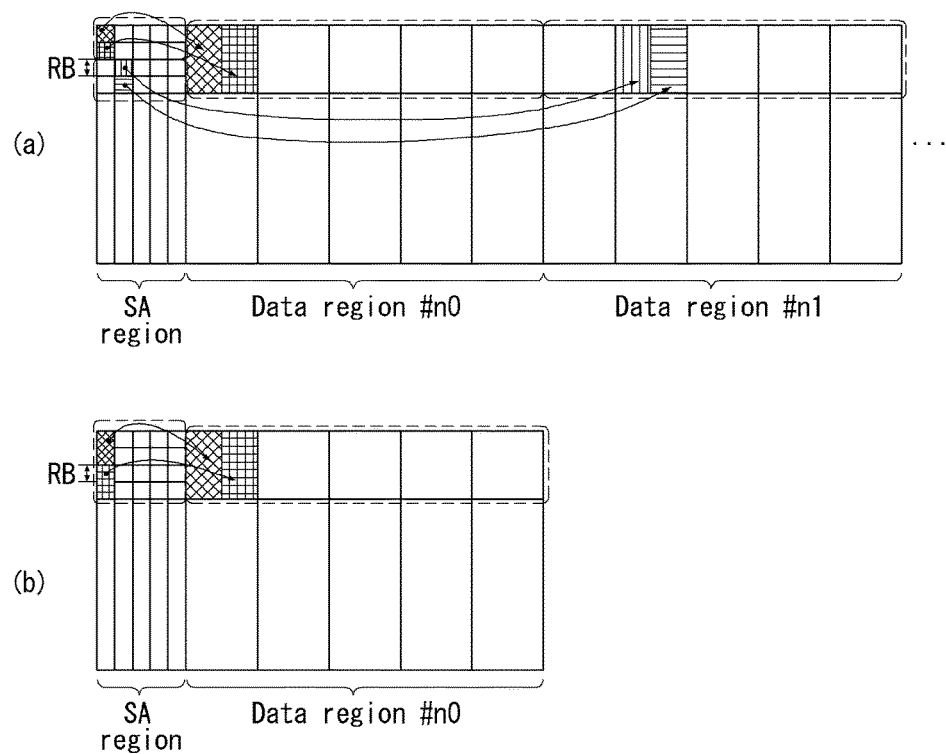
[FIG. 23b]

[FIG. 24]
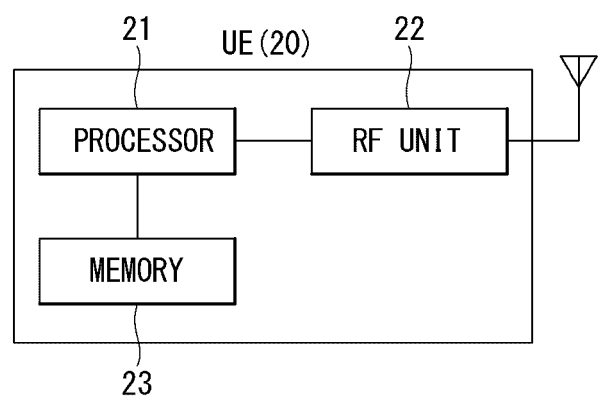

METHOD AND APPARATUS FOR PERFORMING DEVICE-TO-DEVICE DIRECT COMMUNICATION BETWEEN DEVICES IN WIRELESS COMMUNICATION SYSTEM

CROSS REFERENCE TO RELATED APPLICATIONS

This application is the National Phase of PCT International Application No. PCT/KR2015/001482, filed on Feb. 13, 2015, which claims priority under 35 U.S.C. 119(e) to U.S. Provisional Application No. 61/940,304, filed on Feb. 14, 2014 and 61/945,818 filed on Feb. 27, 2014, all of which are hereby expressly incorporated by reference into the present application.

BACKGROUND OF THE INVENTION

Field of the Invention

The present invention relates to a method for performing a direct communication between devices, and more particularly, to a method and apparatus for an allocation of scheduling on a time/frequency resource for performing a device-to-device (D2D) communication between D2D devices.

Discussion of the Related Art

Recently, with the supply of smart phones and tablet PCs, and the activation of high capacity multimedia communication, the mobile traffic has been abruptly increasing. The mobile traffic increase is anticipated as about two fold annually in the future. Since most of the mobile traffic is transmitted through a base station, communication service providers are confronted with a problem of significant traffic load right now. In this reason, the communication service providers have been increased network facilities in order to process the increasing traffic and commercialized the next generation mobile communication standard such as mobile WIMAX and long term evolution (LTE) that enables large amount of traffic to process efficiently in a hurry. However, in order to cope with the amount of traffic that will be more abruptly increased in the future, another solution is required.

The device-to-device (D2D) direct communication is a distributed communication technique through which the traffic between adjacent nodes is directly forwarded not using the infrastructure such as a base station. In the D2D communication environment, each node such as a mobile terminal searches another terminal that is physically near with, and transmits traffic after setting up a communication session. Since the D2D communication may solve the problem of traffic overload by distributing the traffic that is concentrated on a base station, the D2D communication is highly favored as an element technology of the next generation mobile communication technology after 4G technology. For this reason, the standard group such as 3GPP or IEEE has been promoted the establishment of D2D communication standard based on LTE-A or Wi-Fi, and companies such as Qualcomm, and etc. have been developing the D2D communication technology independently.

The D2D communication is expected to create a new communication service as well as it contributes to improve the performance of mobile communication system. In addition, it may support the social network services based on proximity, network games, or the like. As such, the D2D technology is expected to provide new services in various fields.

The D2D communication technology that has been already widely utilized includes the infrared communication, the ZigBee, the radio frequency identification (RFID), the near field communication (NFC) based on this. However, since these technologies support the communication of special object within very limited distance (about 1 m) only, these technologies cannot be classified as the D2D communication technology through which the traffic of a base station is distributed, strictly.

SUMMARY OF THE INVENTION

An object of the present invention is to propose a method and apparatus for allocating the scheduling information for a device-to-device (D2D) direct communication in a wireless communication system.

Another object of the present invention is to propose a method and apparatus for allocating the scheduling information for a device-to-device (D2D) direct communication on a time/frequency resource in a wireless communication system.

A yet another object of the present invention is to provide a method and apparatus for allocating the scheduling information for a plurality of terminals on a time/frequency resource in a device-to-device (D2D) direct communication of a wireless communication system.

A yet another object of the present invention is to provide a method and apparatus for transmitting the scheduling information by which the resource for data transmission is allocated in a device-to-device (D2D) direct communication of a wireless communication system.

A yet another object of the present invention is to provide a method and apparatus for transmitting the scheduling information to a reception terminal without any collisions performed by a plurality of transmission terminals in a device-to-device (D2D) direct communication of a wireless communication system.

The technical objects to attain in the present invention are not limited to the above-described technical objects and other technical objects which are not described herein will become apparent to those skilled in the art from the following description.

According to an aspect of the present invention, a method includes transmitting control information related to a scheduling assignment through a D2D frame defined for the D2D communication to a D2D reception UE, and transmitting D2D data to the D2D reception UE through the D2D frame, wherein the D2D frame includes a contention period in which the control information is transmitted and a D2D data period in which the D2D data is transmitted, and wherein the contention period is located in front of the D2D data period.

In addition, in the present invention, the control information includes information related to an identifier (ID) of the transmission UE or a position of D2D data resource region.

In addition, in the present invention, the contention period includes at least one contention-based SA period, and wherein each contention-based SA period is allocated for each transmission UE.

In addition, in the present invention, the contention-based SA period includes a sub scheduling assignment period for transmitting the control information.

In addition, in the present invention, the contention-based SA period further includes at least one of a DM-RS period for transmitting a demodulation reference signal (DM-RS), a response signal period for receiving a response signal in response to the control information, or an SA guard period.

In addition, in the present invention, the contention period has a structure corresponding to that of the D2D data period.

In addition, the present invention further includes configuring a change probability value of the contention-based SA period; determining whether to change a position of the contention-based SA period according to the change probability value; and increasing or decreasing the change probability value according to a result of the determination.

In addition, in the present invention, a number of symbols included in each of the sub SA period, the DM-RS period, the response signal period and the SA guard period is changed according to a number of the contention-based SA periods.

In addition, in the present invention, a specific symbol in the contention period is null.

In addition, in the present invention, the contention period is configured by using a normal cyclic prefix (CP) or an extended CP.

In addition, in the present invention, the contention period is configured to have a same structure as a structure using the normal CP using the null slot, when the contention period uses the extended CP.

In addition, in the present invention, when a first DM-RS signal is transmitted through a DM-RS period same as another D2D transmission UE, wherein the first DM-RS signal and a second DM-RS signal transmitted by another D2D transmission UE are orthogonal.

In addition, in the present invention, the SA guard period is used as a guard period of a subframe in which the contention-based SA period is included.

In addition, in the present invention, the control information further includes buffer state information of the D2D transmission UE.

In addition, in the present invention, information related to a position of the D2D data resource region includes at least one of frequency hopping information, frequency resource information, time hopping information or time resource information.

In addition, in the present invention, a position of the contention-based SA period in the contention period corresponds to a transmission resource position allocated to the D2D data period.

In addition, in the present invention, an index of the resource block in the contention-based SA period corresponds to an index of a resource allocated to the D2D data period.

In addition, according to another aspect of the present invention, an apparatus includes a communication module for transmitting and receiving signal in wired or wireless manner with exterior and a processor functionally connected to the communication module, wherein the processor is configured to perform: transmitting control information related to a scheduling assignment through a D2D frame defined for the D2D communication to a D2D reception UE and transmitting D2D data to the D2D reception UE through the D2D frame, wherein the D2D frame includes a contention period in which the control information is transmitted and a D2D data period in which the D2D data is transmitted, and wherein the contention period is located in front of the D2D data period.

In addition, in the present invention, the control information includes information related to an identifier (ID) of the transmission UE or a position of D2D data resource region.

In addition, in the present invention, the contention period includes at least one contention-based SA period, and wherein each contention-based SA period is allocated for each transmission UE.

In addition, in the present invention, the contention-based SA period includes a sub scheduling assignment period for transmitting the control information.

In addition, in the present invention, the contention-based SA period further includes at least one of a DM-RS period for transmitting a demodulation reference signal (DM-RS), a response signal period for receiving a response signal in response to the control information, or an SA guard period.

BRIEF DESCRIPTION OF THE DRAWINGS

FIG. 1 illustrates a structure a radio frame in a wireless communication system to which the present invention can be applied.

FIG. 2 is a diagram illustrating a resource grid for one downlink slot in the wireless communication system to which the present invention can be applied.

FIG. 3 illustrates a structure of a downlink subframe in the wireless communication system to which the present invention can be applied.

FIG. 4 illustrates a structure of an uplink subframe in the wireless communication system to which the present invention can be applied.

FIG. 5 IS A DIAGRAM FOR CONCEPTUALLY DESCRIBING D2D COMMUNICATION.

FIG. 6 illustrates examples of various scenarios of the D2D communication to which the method proposed in the specification may be applied.

FIG. 7 is a flowchart illustrating an example of a method for transmitting D2D data proposed in the present specification.

FIGS. 8a to 8c are a diagram illustrating a frame structure for transmitting scheduling information proposed in the present specification.

FIG. 9 is a flowchart illustrating an example of a method for selecting a transmission resource for transmitting the allocation information of scheduling proposed in the present specification.

FIG. 10 is a flowchart illustrating another example of a method for selecting a transmission resource for transmitting scheduling information proposed in the present specification.

FIGS. 11a to 11c are diagrams illustrating examples of a structure of scheduling assignment in a subframe proposed in the present specification.

FIG. 12 is a diagram illustrating an example of a structure of the scheduling assignment in a subframe proposed in the present specification.

FIG. 13 is a diagram illustrating an example of a structure of the scheduling assignment in a subframe in which an extended cyclic prefix (CP) proposed in the present specification is used.

FIG. 14 is a diagram illustrating an example of a structure of the scheduling assignment in a subframe for transmitting a demodulation reference signal (DM-RS) proposed in the present specification.

FIG. 15 is a diagram illustrating another example of a structure of the scheduling assignment in a subframe for transmitting a demodulation reference signal (DM-RS) proposed in the present specification.

FIG. 16 is a diagram illustrating an example of a structure of the scheduling assignment for configuring the guard period between subframes proposed in the present specification.

FIGS. 17 and 18 are diagrams illustrating an example of the signal configuration scheme in a subframe proposed in the present specification.

FIG. 19 is a diagram illustrating an example of a method for providing the resource information through the scheduling assignment proposed in the present specification.

FIGS. 20 to 23b are diagrams illustrating an example of a method for providing the resource information through the implicit signaling method proposed in the present specification.

FIG. 24 is a block diagram illustrating a UE in a wireless communication system according to an example of the present invention.

DETAIL DESCRIPTION OF THE INVENTION

The objects, characteristics and merits of the present invention mentioned above will be clear through the following detailed description in relation to the accompanying drawings. Particular embodiments will be exemplified by the drawings and will be described in detail. However, the present invention may be variously modified and have several embodiments. In general, the same reference numerals represent the same elements throughout the specification. In addition, if it is determined that detailed description for known functions or elements in relation to the present invention unnecessarily obscures the concept of the present invention, then, the detailed description will be omitted.

The method and apparatus in relation to the present invention now will be described in more detail hereinafter by reference to the accompanying drawings. The suffixes "module" and "unit" for the elements used in the following description are added or mixed considering only for convenience of writing specification, but do not have meanings or functions distinguished with each other in itself.

The electronic devices described in the present specification may include mobile phones, smart phones, laptop computers, terminals for digital broadcasting, personal digital assistants (PDSs), portable multimedia players (PMPs), navigation, etc. However, it is apparent to those skilled in the art that the construction according to the embodiments described in the present specification may be applied to fixed terminals such as digital TVs, desktop computers, etc. except for the case that the construction according to the embodiments is applicable only to mobile terminals.

Generally, the term 'base station' used in this application is referred to as a point that may be fixed or mobile, and communicates with a terminal, and may be a term that is commonly known as a base station, a Node-B, an eNode-B, a femto-cell, and so on.

In a mobile communication system, a user equipment may receive information from a base station through downlink, and in addition, the user equipment may transmit information through uplink. The information that the user equipment transmits or receives includes data and various pieces of control information, and there are various physical channels according to the use types of the information that the user equipment transmits or receives.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. The LTE-advance (LTE-A) is an evolution of the 3GPP LTE.

In addition, the specific terms used in the description below are provided to help the understanding of the present invention, and such specific terms may be changed to other forms within the scope of the inventive concept of the present invention.

The signal described in the present specification may be transmitted in a form of frame as well as in a form of message.

General System

FIG. 1 ILLUSTRATES A STRUCTURE A RADIO FRAME IN A WIRELESS COMMUNICATION SYSTEM TO WHICH THE PRESENT INVENTION CAN BE APPLIED.

IN 3GPP LTE/LTE-A, RADIO FRAME STRUCTURE TYPE 1 MAY BE APPLIED TO FREQUENCY DIVISION DUPLEX (FDD) AND RADIO FRAME STRUCTURE TYPE 2 MAY BE APPLIED TO TIME DIVISION DUPLEX (TDD) ARE SUPPORTED.

FIG. 1(A) EXEMPLIFIES RADIO FRAME STRUCTURE TYPE 1. THE RADIO FRAME IS CONSTITUTED BY 10 SUBFRAMES. ONE SUBFRAME IS CONSTITUTED BY 2 SLOTS IN A TIME DOMAIN. A TIME REQUIRED TO TRANSMIT ONE SUBFRAME IS REFERRED TO AS A TRANSMISSIONS TIME INTERVAL (TTI). FOR EXAMPLE, THE LENGTH OF ONE SUBFRAME MAY BE 1 MS AND THE LENGTH OF ONE SLOT MAY BE 0.5 MS.

ONE SLOT INCLUDES A PLURALITY OF ORTHOGONAL FREQUENCY DIVISION MULTIPLEXING (OFDM) SYMBOLS IN THE TIME DOMAIN AND INCLUDES MULTIPLE RESOURCE BLOCKS (RBS) IN A FREQUENCY DOMAIN. IN 3GPP LTE, SINCE OFDMA IS USED IN DOWNLINK, THE OFDM SYMBOL IS USED TO EXPRESS ONE SYMBOL PERIOD. THE OFDM SYMBOL MAY BE ONE SC-FDMA SYMBOL OR SYMBOL PERIOD. THE RESOURCE BLOCK IS A RESOURCE ALLOCATION WISE AND INCLUDES A PLURALITY OF CONSECUTIVE SUBCARRIERS IN ONE SLOT.

FIG. 1(B) ILLUSTRATES FRAME STRUCTURE TYPE 2. RADIO FRAME TYPE 2 IS CONSTITUTED BY 2 HALF FRAMES, EACH HALF FRAME IS CONSTITUTED BY 5 SUBFRAMES, A DOWNLINK PILOT TIME SLOT (DWPTS), A GUARD PERIOD (GP), AND AN UPLINK PILOT TIME SLOT (UPPTS), AND ONE SUBFRAME AMONG THEM IS CONSTITUTED BY 2 SLOTS. THE DWPTS IS USED FOR INITIAL CELL DISCOVERY, SYNCHRONIZATION, OR CHANNEL ESTIMATION IN A TERMINAL. THE UPPTS IS USED FOR CHANNEL ESTIMATION IN A BASE STATION AND TO MATCH UPLINK TRANSMISSION SYNCHRONIZATION OF THE TERMINAL. THE GUARD PERIOD IS A PERIOD FOR REMOVING INTERFERENCE WHICH OCCURS IN UPLINK DUE TO MULTI-PATH DELAY OF A DOWNLINK SIGNAL BETWEEN THE UPLINK AND THE DOWNLINK.

IN FRAME STRUCTURE TYPE 2 OF A TDD SYSTEM, AN UPLINK-DOWNLINK CONFIGURATION IS A RULE INDICATING WHETHER THE UPLINK AND THE DOWNLINK ARE ALLOCATED (ALTERNATIVELY, RESERVED) WITH RESPECT TO ALL SUBFRAMES. TABLE 1 SHOWS HE UPLINK-DOWNLINK CONFIGURATION.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | U | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | — | — | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IF (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

FIG. 5 (a) is a diagram for conceptually describing D2D communication.

In the eNB-oriented conventional communication scheme, a UE1 20 may transmit data to an eNB 10 on uplink, and the eNB 10 may transmit data to the UE1 20 or the UE2 30 on downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 5 (b) illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

Such a D2D direct communication, the transmission UE and the reception UE are classified according to its role, and are not fixed concept. That is, the transmission UE is called since the transmission UE plays the role of transmitting data or messages to the reception UE. When the transmission UE receives data or messages from another transmission UE, the transmission UE may become a reception UE.

Such a concept of transmission UE and reception UE is used as the same concept in the specification below.

The present invention relates to how to dispose and transmit the scheduling information that is scheduling the resource for a transmission UE to transmit data to a reception UE in which scheme in the D2D communication.

FIG. 6 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 6 (a) illustrates an example of an out-of-coverage network scenario of the D2D communication.

The out-of-coverage network scenario means perform the D2D communication between the D2D UEs without control of the base station.

Referring FIG. 6(a) above, it is shown that an eNB is not existed but the UE1 20 and the UE2 30 are existed, and the UE1 20 and the UE2 perform the direct communication.

FIG. 19(b) illustrates an example of a partial-coverage network scenario of the D2D communication.

The partial-coverage network scenario means performing the D2D communication between the D2D UE positioned in the network coverage and the D2D UE positioned out of the network coverage.

In FIG. 6 (b) above, it is shown that the UE1 20 located within a network coverage and the UE2 30 located outside the network coverage communicate with.

FIG. 6(c) illustrates an example of the in-coverage-single-cell and FIG. 6 (d) illustrates an example of the in-coverage-multi-cell scenario.

The in-coverage network scenario is referred to as the case that D2D UEs perform the D2D communication through the control of an eNB within the network coverage.

In FIG. 6(c) above, the UE1 20 and the UE2 30 are located within the same network coverage (or cell), and perform the D2D communication under the control of eNB.

In FIG. 6(d) above, the UE1 20 and the UE2 30 are located within network coverage, but are located different network coverage different with each other. And, the UE1 20 and the UE2 30 perform the D2D communication under the control of eNBs that manage the respective network coverage.

Here, the D2D communication will be described in more detail.

The D2D communication may operate in the scenario illustrated in FIG. 6, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1(20) has a role of the discovery message transmission, the UE 1(20) transmits the discovery message and the UE 2(30) receives the discovery message. The transmission and the reception of the UE 1(20) and the UE 2(30) may be reversed. The transmission from the UE 1(20) may be received by one or more UEs such as UE2(30).

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource.

For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

FIG. 7 is a flowchart illustrating an example of a method for transmitting D2D data proposed in the present specification.

Referring to FIG. 7 above, a transmission UE 20 may transmit control information to a reception UE 30 in order to perform the D2D communication. The control information may be used to notify that the transmission UE 20 tries to perform the D2D communication to the reception UE 30 in the D2D communication.

The control information may include various pieces of information for the transmission UE 20 to perform the D2D communication. For example, the information may include an identifier (ID) of the transmission UE, a buffer state of the transmission UE 20, the position information of the resource that is to be used for the transmission UE 20 to perform the D2D communication, and the like.

Such control information mentioned above may be transmitted in a contention-based scheduling assignment (SA) period in a contention period.

The contention-based SA period may include a sub-SA period that is a period for transmitting the control signal, a Demodulation Reference Signal (DM-RS) period for transmitting the DM-RS, and/or an SA guard period.

The data structure for such a D2D communication will be described by reference to FIG. 8 below.

The transmission UE 20 that transmits the control information may transmit the D2D data through the transmission resource of the D2D data period that is notified to the reception UE 30 through the control information (step, S730).

FIGS. 8a to 8c are a diagram illustrating a frame structure for transmitting scheduling information proposed in the present specification.

Referring to FIGS. 8a to 8c above, the frame structure according to the present invention may be divided into a contention period that includes the allocation information of scheduling and a D2D data period for transmitting the data of D2D communication.

Particularly, as shown in FIGS. 8a to 8c above, it will be described the case that UEs identify the scheduling information through the corresponding period by placing a scheduling period in a front part of the period in which actual data transmission is performed.

In the scheduling period, first, a transmission UE 20 that tries to transmit a D2D signal transmits the message notifying the fact that the transmission UE 20 tries to transmit the signal. Hereinafter, such a message is referred to as a control message. The control message may include predetermined signatures or all sorts of information of the transmission UE for more smooth scheduling, for example, an identifier (ID) of the transmission UE 20, a buffer state of the transmission UE and a position of the resource to be used for the D2D data communication such as control information including a pattern of time or frequency resources for transmission.

The control message may have the form of codeword in which the information of the transmission UE 20 is encoded through a channel coding, or a signature may be transmitted by one that is selected according to the information of the transmission UE or probabilistically selected among a plurality of signatures.

Since the control message may be simultaneously transmitted by a plurality of transmission UEs, two or more periods when the control message may be transmitted are defined, and each of the UEs probabilistically selects a period so that the control message is transmitted during the period. For the reason above, a plurality of the transmission UEs 20 may be operated so as to transmit the control message to the reception UE 30 through different periods with each other probabilistically.

In the case of FIG. 8*a* and FIG. 8*b* above, the UE that initially transmits the control message in a specific contention period may transmit data in the subframe of the corresponding D2D data period.

That is, when a transmission UE fail to detect the control message of another transmission UE before the time when the transmission UE transmits the control message, or even though the transmission UE detects the control message, when the quality of the received control message of another transmission UE is lower than a predetermined level, the transmission UE regards that the subframe of the corresponding D2D data period is occupied by its own.

FIG. 8*c* above shows that the reception UE 30 that receives the control message may reply to the control message. Hereinafter, such a signal is referred to as a response signal.

The response signal may include the information on the control message. This is designed for a UE that receives the response signal to check whether the corresponding response signal is the reply to the control message that is received by its own. For example, the response signal may include the signature used in the control message or the ID information of the transmission UE 20.

The transmission UE 20 that transmits the control message and receives the response signal in response to this may perform the regular D2D data transmission by determining that the D2D communication is available basically.

The operation described in FIG. 8 above may be correspond to scheduling a D2D link in the meaning of determining the data transmission of a specific D2D link in a specific time.

FIG. 9 is a flowchart illustrating an example of a method for selecting a transmission resource for transmitting the allocation information of scheduling proposed in the present specification.

Referring to FIG. 9 above, the transmission resource (or period) for transmitting the allocation information of scheduling may be transmitted in every frame with being changed/selected probabilistically.

Particularly, in the resource allocation operation of D2D, the pattern of the structure shown in FIG. 8 above (corresponding to a single D2D frame in FIG. 8*c* above) may be repeatedly occurred, that is, a series of contention period for transmitting the control message that includes the scheduling information (or control information) is shown first and the D2D data period in which the data is transmitted by the resource that is known through the control information in the contention period is subsequently shown.

The transmission UE 20 may transmit its own SA only in its own contention-based SA period in the contention period of each D2D frame and change the position of the D2D data transmission resource through it.

However, when a plurality of UEs simultaneously tries such a resource change in the same D2D frame, a collision occurs between the SA transmissions in the contention period shown in FIG. 8, and interference occurs while the reception UE 30 performs the SA reception properly.

In order to prevent the SA collision, each of the transmission UEs may operate to probabilistically determine whether the position of the transmission resource of SA or the SA transmission period (or the transmission resource of the data linked to it) may be changed in each of the D2D frames.

The transmission UE 20 determines whether to change the SA transmission period or the SA transmission resource with probability P when each D2D frame is started with the probability value P that is signaled by an eNB or predetermined (step, S910).

In this case, the change of the SA transmission period or SA transmission resource includes the determination on whether to change the period or the resource that is preoccupied by the transmission UE.

Since the change of the period or resource probabilistically occurs, there may be a case that the change of a specific transmission UE may continuously occur or fail to change it for a long time. Accordingly, in order to prevent the case (e.g., in order to guarantee the fairness of scheduling), the change probability P may have a changeable value.

When the transmission UE determines to change the transmission period or resource, the transmission UE selects a proper transmission period or resource (e.g., the resource of which interference is lower than a certain level) among all resources that are different from the transmission period or resource previously occupied (step, S920), and decreases the change probability P (step, S930).

That is, when the resource was changed in a previous time, the probability value for the change of period or resource may be decreased in the next time. As an example, in the case that the change of period or resource is made while the change probability is P(k) at the $k^{th}$ resource selection time, $(k+1)^{th}$ P value may be setup as Equation 1 below.

$$P(k+1)=P(k)-\delta_{down}(0\leq\delta_{down}\leq1) \quad \text{[Equation 1]}$$

The lower limit value of P(k+1) is 0, and when the count of consecutive change of the period or resource is more than a predetermined value, the P(k+1) value may be determined to be 0.

However, when the transmission UE determines not to change the transmission period or resource, the transmission UE selects the period or resource (or the transmission resource of the data linked to it) for the SA transmission that was used in the existing D2D frame (step, S940), and increases the change probability P (step, S950).

For example, in the case that the change of period or resource is not made while the change probability is P(k) at the $k^{th}$ resource selection time, the change probability of $(k+1)^{th}$ period or resource may be setup as Equation 2 below.

$$P(k+1)=P(k)+\delta_{up}(0\leq\delta_{up}\leq1) \quad \text{[Equation 2]}$$

The upper limit value of P(k+1) is 1, and when the count of failures in consecutive change of the period or resource is more than a predetermined value, the P(k+1) value may be determined to be 1.

Through the process above, the transmission UE selects the transmission period or resource for the SA transmission, and transmits the SA through the selected period or resource. Through such a process, the collision occurred when a plurality of UEs simultaneously changes the SA transmission period or resource and transmits SA to the same resource may be prevented.

FIG. 10 is a flowchart illustrating another example of a method for selecting a transmission resource for transmitting scheduling information proposed in the present specification.

Referring to FIG. 10 above, different from FIG. 9 above, the existing transmission period or resource may be selected even in the case of determining to change the transmission period or resource.

Hereinafter, the description of the process as the same as FIG. 8 above will be omitted.

The transmission UE 20 may determine whether to change the transmission period or resource for transmitting the scheduling assignment (SA) (step, S1010), as the same as step, S910 of FIG. 9 above.

In this time, when determining to reselect the existing transmission period or resource without any changes, similar to steps, S940 and S950, the transmission UE 20 selects the existing period or transmission resource (step, S1060), and increases the change probability P (step, S1070).

However, when the transmission UE 20 determines to change the transmission period or resource for transmitting the SA, the transmission UE determines whether the transmission period or resource for transmitting the SA that was used in the existing D2D frame is a proper transmission resource (step, S1020).

As a result of the determination, in the case that the existing transmission period or resource is not a proper transmission resource, similar to steps, S920 and S930, the transmission UE 20 selects a different period or transmission resource (step, S1040), and decreases the change probability P (step, S1050).

However, as a result of the determination, in the case that the existing transmission resource is a proper transmission period or resource, for example, a transmission resource which undergoes little interference from neighboring transmission UEs and enables many reception UEs to successfully receive the SA, the transmission UE may select the existing transmission period or resource without changing the transmission period or resource (step, S1030).

At the moment, even though the transmission period or resource is not changed, the transmission UE 20 determines that the chance of changing the transmission period or resource has been used, and decreases the change probability P (step, S1050).

Later, the transmission UE transmits the SA through the selected transmission period or resource (step, S1080).

FIGS. 11a to 11c are diagrams illustrating examples of a structure of scheduling assignment in a subframe proposed in the present specification.

Hereinafter, the resource structure for transmitting the signal related to the scheduling assignment (SA) will be described in the aspect of the uplink spectrum (e.g., PUSCH) of the conventional LTE.

The elements related to the SA and uplink (UL) subframe include the control message described above, a response signal (the response signal may be unnecessary according to a resource reservation scheme), a guard period and/or a DM-RS, and so on. The SA structure will be described by considering these elements.

In the case that only the control message is transmitted by the SA, the format of the SA is almost entirely determined depending on the control message and the size of the guard period. Here, particularly, the case of using the subframe of a normal CP will be described. Since there is one DM-RS period per slot in the PUSCH region of uplink subframe, twelve symbols per subframe may be used to the maximum.

The twelve symbols are divided by each of the SAs and used. The control message may contain the information related to a UE to transmit and the information related to the contention signal (e.g., signature index, etc.), or the like. In some cases, many resources may be required.

Accordingly, one or more symbols may be allocated, and in the case of lack of resources, 0.5 symbol may be used.

In the case of (a) in FIG. 11a above, the structure is shown that a single symbol is used for the control message and a single symbol is used for each of the guard periods (GPs), and total six SAs may be included in a single subframe. In the case of (b) in FIG. 11a, the case is shown that two symbols are used for the control message, and in the case of (c) in FIG. 11a above, the case is shown that three symbols are used for the control message.

In the case that a switching time is not required significantly between respective SAs, the GP is not necessarily required to have a symbol size of the number of an integer value of one or more. For example, when the control message occupies one symbol and the GP occupies 0.5 symbols, as shown in (a) in FIG. 11b, a single control message symbol lies on two OFDM symbols in the conventional PUSCH structure.

In the structure of (a) in FIG. 11b above, owing to the reduced size of GP period, eight SAs may be accepted in a single subframe. The part of (b) in FIG. 11b above shows the case that the control message occupies 0.5 symbol and the GP occupies 0.5 symbols, and twelve SAs may be included.

As shown in FIG. 11a and FIG. 11b above, in the case that the valid period of the subframe is not divided by the SAs without a remainder, a part of the symbols within the subframe may not be used for the SA (may be discarded or reserved for other signal, data, etc.).

As shown in FIG. 11c above, in order to decrease the number of discarded symbols as many as possible, a contention period may be made up by connecting a plurality of subframes. In (a) of FIG. 11c above, the control message includes four symbols, and when the GP period corresponds to a single symbol, a maximum of two SAs may be included in a single subframe. That is, a single SA is allocated for a slot, and a DM-RS may be allocated for each SA.

In (b) of FIG. 11c above, in order to minimize the number of discarded symbols and to further minimize overhead, two SAs are allocated with being connected without an empty symbol, and a plurality of subframes is connected.

FIG. 12 is a diagram illustrating an example of a structure of the scheduling assignment in a subframe proposed in the present specification.

Referring to FIG. 12 above, different from FIGS. 11a to 11c above, a response signal in addition to the control message may be transmitted together to the SA.

Particularly, in the case that both of the control message and the response signal are transmitted to the SA, the format of SA may be more complex than that of the structure of FIGS. 11a to 11c above described above. In the case of using a subframe of a normal CP, a maximum of twelve symbols per a single subframe may be used. The control message may include the information related to a transmission UE or the information related to a contention signal (signature index, etc.), and in some cases, many resources may be required.

Accordingly, one or more symbols may be allocated to the control message, and in the case of lack of resources critically, 0.5 symbols may be allocated.

Similar to the control message, one or more symbols may also be allocated to the response signal. Since the response signal may include a short message such as the response signal of UEs that receive the control message, the response signal may maintain the smaller size than that of the control message. The GP period may also be designed for a required Tx/Rx switching time.

FIG. 12(a) above shows that a single symbol is allocated to each of the control message, the GP and the response signal as a basic unit. In this case, four SAs are given for each subframe, and this may cause an overhead of great size in a certain situation.

Accordingly, different from FIG. 12(a) above, the size of each of the elements may be decreased.

FIG. 12(b) above shows that a single symbol is allocated to a signal 1 Sig1, and 0.5 symbol is allocated to each of the GP and the response signal. FIG. 12(c) shows that 0.5 symbol is allocated to each of the control message, the GP and the response signal, and the number of SA per subframe is increased to 6 to 8. Such a structure is similar to the structure shown in (a) of FIG. 11a and (a) of FIG. 11b above.

Surely, in the case that many pieces of information is carried on the control message, a great number of symbols may be allocated, and in the case that two symbols are used for the control message, the number of SAs allocated to each subframe is further decreased.

In such a case, the contention count may be decreased, and the resource that is determined once may be maintained in a semi-static manner so far as possible.

FIG. 13 is a diagram illustrating an example of a structure of the scheduling assignment in a subframe in which an extended cyclic prefix (CP) proposed in the present specification is used.

Referring to FIG. 13 above, when using an extended CP in LTE uplink (UL) spectrum, a single UL subframe includes twelve symbols, which is the case that two symbols are decreased in comparison with the case of the normal CP shown in FIGS. 11a to 12.

In this case, in order to reduce the complexity, the scheme of normal CP shown in FIGS. 11a to 12 may be reused. In the case that the scheme of normal CP is unable to be used since its available size of the resource is too small, the scheme of decreasing a part of elements in the SA structure or configuring a smaller number of SAs than the normal CP in a single subframe may be used.

In the extended CP, an available number of symbols is decreased by two symbols (per subframe) in comparison with the normal CP. In the case that there are two or more remaining symbols that are not used for the SA in a subframe of the existing normal CP, the same structure is maintained except this in the subframe of the extended CP. For example, in order to reuse the configuration shown in (a) of FIG. 11c, it may configure such that there is no empty symbol as shown in FIG. 13(a), and the number of SAs per subframe may also be maintained by two as the same manner.

In the case that there is no discarded symbol, in the configuration of FIGS. 11a to 12 above, the number of symbols that are allocated to the control message, the guard period (GP) or the response signal may be decreased. In this case, the number of SAs per subframe may be different according to circumstances. For example, in order to reuse the configuration (three symbols per SA) shown in FIG. 12(a) for the normal CP in the extended CP shown in FIG. 12, the SA should be configured by decreasing a half symbol (two symbol per SA) in each of the GP and the response signal as shown in FIG. 13(b).

In addition to two schemes above, a new configuration that is proper for the extended CP may be designed, which is separate from the configuration for the normal CP.

FIG. 14 is a diagram illustrating an example of a structure of the scheduling assignment in a subframe for transmitting a demodulation reference signal (DM-RS) proposed in the present specification.

Referring to FIG. 14 above, when a transmission UE transmits each of the signals (e.g., control message and response signal) of SA, reception UEs may transmit the signals with a DM-RS so as to demodulate the signals. In this case, the case may be occurred that a plurality of transmission UEs simultaneously transmits the DM-RS in a single contention slot. At the moment, the schemes for transmitting the DM-RS are as follows.

First, the number of SAs that are configured in a single contention slot may be limited to 1 or 2.

That is, in order to maintain the single carrier property, a single SA is transmitted for each subframe or half-subframe (1 slot) on a contention slot.

However, as shown in FIG. 12 and FIG. 13 above, when both of the control message and the response message are transmitted (particularly, when a plurality of UEs transmits the response signal together with the DM-RS in a response signal period), even the method above may be impossible.

In such a case, as a response to the reception of the control message, a signal, which is previously acknowledged by the transmission UE that transmits the control message, may be detected in the response signal. And, in the case that the signal is detected, the demodulation of the DM-RS may not be required.

Second, when three or more SAs are transmitted in a single contention slot, the Tx UEs that use the respective SAs may transmit the DM-RSs that are mutually orthogonal.

In this case, each of the SAs uses both of two DM-RS symbols, or uses one of two DM-RS symbols, or uses less than one symbol of two DM-RS symbols.

When each of the SAs uses one symbol of two DM-RS symbols, ① the DM-RS included in a SA period is transmitted in the corresponding SA, ② in the case that there is no DM-RS included in the SA period, the nearest DM-RS may be transmitted in the corresponding SA. Or, ③ in the case that two DM-RS symbols have in the same distance from a specific DM-RS, a predetermined DM-RS symbol may be transmitted.

When each of the SAs uses less than one symbol of two DM-RS symbols, similar to the case of dividing the elements of SA into less than one symbol, the DM-RS symbols may be allocated according to the number of SAs. For example, in the case of the configuration of using four SAs as shown in FIG. 14 above, each of the DM-RS symbols may be used with being divided by 0.5 symbol.

FIG. 15 is a diagram illustrating another example of a structure of the scheduling assignment in a subframe for transmitting a demodulation reference signal (DM-RS) proposed in the present specification.

Referring to FIG. 15 above, in the state that there are limited DM-RS resources, when several transmission UEs have to use a resource by multiplexing it within a single resource block (RB), the method that the UEs use the DM-RS after classifying it. Hereinafter, the method will be described with illustration.

First, different cyclic shift/orthogonal cover code (OCC) values from each other may be used.

In the situation of using the given DM-RS resources thoroughly or partly, the cyclic shift, OCC, or the like should be distinguished in the part of using the DM-RS that is overlapped with different UEs.

That is, when SA #0 to SA #(n−1) are defined, the SAs are matched to cs #0 to cs #(n−1) or OCC #0 to OCC #(n−1), respectively.

In this case, it is not necessary to match them by the same index, and the number of cs types or the number of OCC types may be equal to or greater than the number of SAs defined in an RB.

Second, different orthogonal resources from each other may be used. When using a single symbol per slot, which is the DM-RS structure identical to the LTE uplink subframe, a single SA per subframe or slot may be configured.

However, when a part of the DM-RS is divided to use, it may not be configured as a single SA per subframe or slot, and this may be the same as FIG. 14 above.

For example, a specific UE may not use all resource elements (REs) on the frequency axis as the DM-RS in a specific symbol, but may use only a part of the REs in a manner of decimation as shown in FIG. 14 above, which may be shown in the shape in which the same time signal is repeated according to a decimation factor in a system such as the general OFDM, not goes through the DFT process in a frequency region as in the SC-FDMA, when it is seen on a time axis.

By going through required processes for generating an OFDM signal (e.g., CP insertion, windowing, etc.), in the case that a part of the repeated signals are taken and the remaining parts are transmitted with being nullified them when transmitting signals actually, several signals may be transmitted even in a single symbol without being overlapped.

In FIG. 15(a), the transmission UE1 (Tx UE #1) performs the DM-RS decimation once per twice times with offset 0 on frequency axis, and the transmission UE2 (Tx UE #2) performs the DM-RS decimation once per twice times with offset 1 on frequency axis.

As such, it may be allowed to use different frequency resources with each other on a frequency axis, and even though using the same frequency resource, the transmission UE1 and the transmission UE2 may be distinguished when the unit of different positions with each other is selected in the symbol of time repetition.

As shown in FIG. 15 above, even though the UEs have the same offset, not having different frequency offsets with each other, the UEs may select different regions with each other in the part of time domain signal that is generated after ITTF.

That is, the transmission UE1 may select $0^{th}$ part among the repeated parts, and the transmission UE2 may select $1^{st}$ part among the repeated parts. And the remaining parts except the selected parts on an OFDM symbol may be transmitted with being nullified. In a reception end, the signal region that is wanted to be detected may be selectively demodulated.

This method may be used in the same way even in case that two or more transmission UEs per symbol are multiplexed. In addition, this method is not confined to the transmission of DM-RS, but may be used in other regions (e.g., data channel) in which symbol division or orthogonalization of resource is required. And, similarly, the DM-RS, the data channel or the guard period may also be used in multiplexing with being divided in a unit of 0.5 symbol or the less symbol unit thereof.

FIG. 16 is a diagram illustrating an example of a structure of the scheduling assignment for configuring the guard period between subframes proposed in the present specification.

Referring to FIG. 16 above, since there may be happened a situation for the transmission UE that transmits data in a specific transmission period to receive data from another transmission UE, it should be guaranteed to receive data stably by placing a guard period next to the data transmission period.

Accordingly, the end part or the front part of each subframe may be discarded owing to the guard period (GP).

In this case, the SA structures mentioned in FIGS. 11 to 14 may be changed. For example, when it is required for guard period of a subframe to secure 0.5 symbol, each of a part of the period among the elements of all of the SAs may be decreased to be 0.5 symbol.

Particularly, the GP or the response signal of the last SA in each subframe may be decreased to be 0.5 symbol. As shown in FIG. 16, the GP of the corresponding SA is already 0.5 symbol, the GP value of the SA is deleted altogether and replaced by the GP of subframe.

In order to reuse the methods described in FIGS. 11a to 14 in which the subframe GP is not considered, only the structure of the last SA may be changed. Otherwise, in order to prevent malfunction in the corresponding SA, the last SA period is entirely eliminated or a new frame structure may be configured excluding the GP period (separate from the methods in which the subframe GP is not considered).

The symbol in very front part in addition to the symbol in very end part in each subframe may also be a target region to be secured as a guard period, even in this case, the GP of subframe may be configured as the same way as the end part of each subframe.

As another embodiment of the present invention, the SA may be configured in a subframe by considering AGC. In the structure of FIGS. 11a to 16 described above, an operation is assumed in the case that the dynamic range of the reception UE is stabilized, and the gain of AGC may not be properly setup in the early state of communication.

Accordingly, when the AGC operation is required, a time for tracking it may be additionally required. During the period in which the AGC is initialized for the period, the number of symbols for the control message may be increased. Using the added symbol, the signal that was previously to be sent to the control message may be repeatedly sent.

As configuring the SA according to the AGC operation, the remaining SA is shifted with an offset or the number of symbol used for all or a part of SAs that are used in a non-AGC region may be decreased.

A part of D2D frames is designed for the AGC, and the start symbols of all SAs are used for the AGC tracking, and therefore, the period of the part of the signal (e.g., control message) in front part of each SA may be increased.

At the moment, the size of AGC contention period becomes longer than that of other contention period, and in order to maintain the length same with other contention period, the elements of SAs are closely arranged or the number of symbol may be decreased in the remaining period as many as the number of increased ACG tracking symbols in the AGC contention period.

The structure described in FIGS. 11a to 16 may be independently used or used in combination. For example, the case may be considered that the AGC is not applied in the subframe of the extended CP. When the AGC in the extended CP is considered, each of the principle described in relation to the extended CP and the principle described in relation to the AGC may be considered in combination.

FIGS. 17 and 18 are diagrams illustrating an example of the signal configuration scheme in a subframe proposed in the present specification.

Referring to FIGS. 17 and 18, except the SA configuration scheme described above, another SA configuration will be described.

FIG. 17 corresponds to the case that two SAs are in a subframe in the extended CP configuration, and shows the structure that the SA of a UE is transmitted in a slot. FIG. 17(a) corresponds to the case that a single DM-RS is used in the SA of each slot, and the last symbol of the slot is remained as a transition symbol. FIGS. 17(b) to 17(d) correspond to the structure in which the channel estimation performance may be improved by inserting the RS of two symbols in each SA. The distance between the DM-RSs is different in each scheme.

FIG. 18 corresponds to the structure in which three SAs are in a single subframe. Each of the SAs includes a DM-RS symbol and two SA symbols. Particularly, in this case, the same SA coded bit is repeatedly transmitted from two symbols. In this structure, particularly, by operating the AGC in the front symbol, even though a reception is failed, the reception of the same signal through the rear symbol may be available.

FIG. 19 is a diagram illustrating an example of a method for providing the resource information through the scheduling assignment proposed in the present specification.

In describing a method that a transmission UE 20 transmits the resource information through the scheduling assignment by reference to FIG. 19, the reception UE may indicate the data resource related to a single SA.

In this case, the transmission UE may indicate a single contiguous resource unit as shown in FIG. 19(a), or indicate a single group (e.g., the shape in which the elements of resource unit are hopped) as shown in FIG. 19(b) or indicate the shape in which a plurality of resource units is combined.

At the moment, when a complex form of resource allocation is performed or many patterns that are not previously designated are included, the amount of information that is loaded on the SA may be increased. Accordingly, a proper signaling scheme for the resource information in SA and the region of SA/data resource will be described below.

Firstly, a method for the transmission UE to indicate a resource unit through an explicit signaling method will be described.

When the transmission UE indicates the resource unit by including the frequency information in the resource information, CD the frequency hopping information may be included. The frequency hopping information may include 1) the frequency hopping information for each SA. At the moment, in the case that the frequency hopping is applied only to a part of frequency region or a part of resource pool, the SA requires a field for distinguishing these.

2) In the case that the frequency hopping information is not existed in the SA but predetermined, and in the case that an identical frequency hopping pattern is applied to all resource units (RUs) in the whole band of a specific data region (or in the case of not hopping), it is not required to indicate whether to perform hopping for each SA, but whether to performing hopping or the pattern may be predetermined.

Otherwise, instead of the frequency hopping information, the transmission UE may transmit the frequency resource information to the reception UE.

Particularly, the unit of frequency which is a basis of frequency allocation such as an RB may be represented by a bitmap. For example, when there are F RBs and the frequency unit is M RBs, the required bit value may be calculated by Equation 3 below. Herein, floor(x) is a function that calculates the largest value among the integer not greater than x.

$$\text{floor}(F/M)\text{bit} \qquad \text{[Equation 3]}$$

As another method, one of a unit of frequency that is a basis of frequency allocation such as an RB (or a plurality of RBs) may be selected and represented.

For example, when there are F RBs and the frequency unit is M RBs, and floor(F/M) unit of frequencies are defined, the required bit value may be calculated by Equation 4 below. Herein, ceil(x) is a function that calculates the smallest value among the integer not smaller than x.

$$\text{ceil}(\log 2(\text{floor}(F/M))) \qquad \text{[Equation 4]}$$

When the transmission UE indicates a unit of resource by including time information to the resource information, the time information may include at least one of time hopping information or time resource information.

In the case that the time hopping information is included, similar to the frequency hopping information described above, ① When each of the SAs represents the time hopping information, in the case that a time diversity is applied only to a part of time region or a part of resource pool, a field may be included so as to distinguish it in each SA.

② When the time hopping information is predetermined, not existed in the SA, an identical time hopping pattern is applied to all RUs in the entire band of a specific data region, or contiguously allocated without performing time hopping, it is not required to indicate whether to perform hopping for each SA, but whether to performing hopping or the pattern may be predetermined.

In the case that the time resource is included, different from the case of including the time hopping information, it may be changed whether resource pool information is included in the SA.

In the case that the resource pool information is included, ① a unit of time that is a basis of a time region such as a subframe (or a plurality of subframes) may be represented by a bitmap.

For example, when there are T SFs, a unit of time is N subframes (SFs), and ceil(T/N) unit of time is defined, a required bit value may be calculated through Equation 5 below.

$$\text{ceil}(T/N) \qquad \text{[Equation 5]}$$

Otherwise, ② a unit of time that is a basis of a time region such as a subframe may be represented by being selected, in this case, a singular unit of time allocation is available. For example, when there are T SFs, a unit of time is N SFs, and ceil(T/N) unit of time is defined, a required bit value may be calculated through Equation 6 below.

$$\text{ceil}(\log 2(\text{ceil}(T/N))) \qquad \text{[Equation 6]}$$

However, when the resource pool information is included in the SA, in addition to the field related to the resource pool, the allocation information of time resource in the corresponding resource pool should be included.

For the field related to the resource pool, the allocation unit of the resource pool may be represented by a bitmap in a D2D frame, or one of the allocation units of the resource pool may be represented by being selected. In this case, a singular unit of time allocation may be available.

The allocation information of time resource in the resource pool ① a unit of time that is a basis of a time region such as a subframe may be represented by a bitmap in the resource pool. For example, when there are T SFs, a unit of time is N SFs, and ceil(T/N) unit of time is defined, a required bit value may be calculated through Equation 5 above.

Otherwise, ② a unit of time that is a basis of a time region such as a subframe may be represented by being selected in the resource pool. For example, when there are T SFs, a unit of time is N SFs, and ceil(T/N) unit of time is defined, a required bit value may be calculated through Equation 6 above.

The methods described above may be used in combination or in selective manner.

The examples of the allocation information of frequency resource and the allocation information of time resource may be used in combination or in selective manner.

FIGS. 20 to 23b are diagrams illustrating an example of a method for providing the resource information through the implicit signaling method proposed in the present specification.

Referring to FIG. 20 above, the information related to the resource pool may be notified through the implicit signaling method.

Particularly, in the method of finding related resources in a data region after reading the SA, it may be multiplexed in the shape of the SA region being in advance on time axis, that is in the formality of the SA region and the data region being TDM.

When dividing the data region by a certain region called the resource pool, as shown in FIG. 20 above, the SA region has the shape in which the data region is reduced as if in a map, and SAs belonged to different resource pools may also be TDM. In this case, it is not required to put the information related to the resource pool into the SA separately. Here, the set of SA corresponding to resource pool #0 may be represented by SA pool #0, the set of SA corresponding to resource pool #1 may be represented by SA pool #1, and the set of SA corresponding to resource pool #2 may be represented by SA pool #2, and so on.

Referring to FIG. 21 above, the allocation information of frequency region may be notified.

Particularly, in the state that the SA region and the data region is TDM, the SA may not required to include the frequency information, when a certain rule is formed between the frequency allocated to the SA and the frequency allocated to the resource unit.

A resource unit may have a shape of including a plurality of subframes and a plurality of RBs. However, in comparison with the fact that the data channel transmits actual information, whereas the SA corresponds to an overhead for accurately demodulating it, the size of SA may become smaller.

For example, as shown in FIG. 20 above, in the case that the size of a single resource unit is 4 RBs and the size of a single SA is 1 RB, it is only required that a representative RB index among the resource unit of 4 RBs is identical to the RB index of the SA or that a mapping is made one to one between the SA and the RU.

In FIG. 21 above, the size of data region (e.g., period of 20 ms) is configured in the time of a periodic traffic such as VoIP being transmitted, and a single RU period is configured same as the period of resource pool (e.g., 4 ms).

Here, an SA region is not necessarily required to indicate the scheduling information for a data region only. In addition, the case may be occurred that the period of a resource pool is not identical to the period of a resource unit. Hereinafter, it will be described the case that the remaining SAs are used in these two situations.

Referring to FIG. 22 above, it is shown that an SA region covers a data region as many as the RB number of resource unit (RU) divided by the RB number of SA.

Particularly, FIG. 22 above shows that the SA region covers data region #0, data region #1, and so on, and the related data region is determined according to the RB index of SA.

FIG. 22(a) above shows the case that an RU includes four RBs and an SA includes an RB, thereby an SA region may cover four data regions. FIG. 22(b) above shows the case that an RU includes four RBs and an SA includes two RBs, thereby an SA region may cover two data regions.

FIG. 23a and FIG. 23b show the case that a resource pool period is made up of a plurality of RU periods.

Referring to FIG. 23a, it is shown that the size of SA region includes the SAs as many as the number of RUs in the data region. In this case, in the case that the size of data region period is the same as ten RU periods since a resource pool includes two RUs, the SA region is also increased in the same manner.

Referring to FIG. 23b above, the size of SA region is remained and covered by remaining RBs in the same SA period.

Particularly, when the size of SA region increases, the latency increases accordingly. Therefore, the method similar to FIG. 22 above may be applied to the RU period.

FIG. 23(a) shows the structure that a resource pool is indicated through two RBs or SAs since a resource pool includes two RUs.

That is, according to the remaining number of RBs, as shown in (b) of FIG. 23b, an SA region may cover a data region, or cover more data regions as shown in (a) of FIG. 23b.

The method using the implicit signaling or explicit signaling described in FIGS. 19 to 23b may be used in combination or in selective manner. For example, the explicit signaling method is used for all cases, or the explicit signaling method is used for a case and the implicit signaling method is used for another case.

FIG. 24 is a block diagram illustrating a UE in a wireless communication system according to an example of the present invention.

A UE 20 includes a processor 21, a radio frequency (RF) unit 22 and a memory 23. The processor 21 implements the proposed functions, procedure, and/or methods. The layers of the radio interface protocol may be implemented by the processor 21.

The RF unit 22 which is coupled to the processor 21 transmits and/or receives a radio signal. The memory 23 which is coupled to the processor 21 stores a variety of information for driving the processor 21.

The UE 20 may perform the D2D communication with another UE through the RF unit 22, and transmit resource set allocation information to a relay UE.

The processor 21 may include Application-Specific Integrated Circuits (ASICs), other chipsets, logic circuits, and/or data processors. The memory 23 may include Read-Only Memory (ROM), Random Access Memory (RAM), flash memory, memory cards, storage media and/or other storage devices.

The RF unit 22 may include a baseband circuit for processing a radio signal. When the above-described embodiment is implemented in software, the above-described scheme may be implemented using a module (process or function) which performs the above function. The module may be stored in the memory 23 and executed by the processor 21.

The memory 23 may be disposed to the processor internally or externally and connected to the processor 21 using a variety of well-known means.

It will be apparent to those skilled in the art that various substitutions, modifications and variations can be made in the present invention described so far, without departing from the spirit or scope of the inventions by those skilled in the art, and therefore, the present invention is not limited to the described embodiments and the accompanying drawings.

The method and apparatus for allocating the scheduling information using the device-to-device (D2D) communication have the following technical effects.

According to the present invention, the scheduling information for the resource allocation may be efficiently transmitted to a reception UE through the method for allocating the scheduling information for the device-to-device (D2D) communication.

In addition, according to the present invention, a plurality of transmission UEs may transmit the scheduling information for the resource allocation to a reception UE without collision through the method for allocating the scheduling information for the device-to-device (D2D) communication.

Furthermore, according to the present invention, the scheduling information for the resource allocation may be transmitted to a reception UE on a time/frequency resource through the method for allocating the scheduling information for the device-to-device (D2D) communication.

What is claimed is:

1. A method for performing a device-to-device (D2D) communication between D2D devices in a wireless communication system in which a D2D direct communication is supported, the method performed by a transmission terminal and comprising:
    selecting a first resource region for transmitting first control information related to a first scheduling assignment;
    detecting second control information associated with a second scheduling assignment transmitted from at least one transmission terminal through the first resource region;
    transmitting the first control information to a reception terminal through the first resource region or a second resource region according to a result of the detecting the second control information,
    wherein each of the first resource region and the second resource region is a resource region included in a D2D frame defined for D2D communication; and transmitting D2D data to the reception terminal through the D2D frame,
    wherein the D2D frame includes a contention period in which the first control information is transmitted and a D2D data period in which the D2D data is transmitted,
    wherein the contention period is located in front of the D2D data period,
    wherein the contention period includes at least one contention-based scheduling assignment period,
    wherein the at least one contention-based scheduling assignment period is allocated for the transmission terminal,
    wherein the at least one contention-based scheduling assignment period includes a sub-scheduling assignment period for transmitting the first control information, and
    wherein the at least one contention-based scheduling assignment period further includes at least one of a demodulation reference signal (DM-RS) period for transmitting a DM-RS, a response signal period for receiving a response signal in response to the first control information, or a scheduling assignment guard period.

2. The method of claim 1, wherein the first control information includes information related to an identifier (ID) of the transmission terminal or a location of a D2D data resource region.

3. The method of claim 1, wherein the contention period has a structure corresponding to that of the D2D data period.

4. The method of claim 1, further comprising:
    setting a change probability value for changing a resource region for transmitting the first control information;
    determining whether to change a resource region according to the change probability value; and
    increasing or decreasing the change probability value according to a result of the determination.

5. The method of claim 1, wherein a number of symbols included in each of the at least one sub-scheduling assignment period, the DM-RS period, the response signal period and the scheduling assignment guard period are changed according to a number of the at least one contention-based scheduling assignment period.

6. The method of claim 1, wherein a first DM-RS signal and a second DM-RS signal transmitted by another transmission terminal are orthogonal, when the first DM-RS signal is transmitted through a DM-RS period same as the another transmission terminal.

7. The method of claim 1, wherein the scheduling assignment guard period is used as a guard period of a subframe in which the contention-based scheduling assignment period is included.

8. The method of claim 1, wherein the first control information further includes buffer state information of the transmission terminal.

9. The method of claim 1, wherein the first control information includes at least one of frequency hopping information, frequency resource information, time hopping information or time resource information.

10. The method of claim 1, wherein a location of the contention-based scheduling assignment period in the contention period corresponds to a transmission resource position allocated to the D2D data period.

11. The method of claim 1, wherein an index of a resource block in the contention-based scheduling assignment period corresponds to an index of a resource allocated to the D2D data period.

12. The method of claim 1, wherein the first control information is transmitted through the first resource region when the second control information is not detected in the first resource region or a received signal strength of the second control information is less than a threshold value.

13. The method of claim 1, wherein the transmitting the first control information comprises:
    selecting the second resource region when the second control information is detected and a received signal strength of the second control information is greater than a threshold value; and transmitting the first control information through the selected second resource region.

14. An apparatus for performing a device-to-device (D2D) communication between D2D devices in a wireless communication system in which a D2D direct communication is supported, the apparatus comprising:

a transceiver configured to transmit and receive a signal; and a processor functionally connected to the transceiver, wherein the processor is configured to:

select a first resource region for transmitting first control information related to a first scheduling assignment, detect second control information associated with a second scheduling assignment transmitted from at least one transmission terminal through the first resource region, control the transceiver to transmit the first control information to a reception terminal through the first resource region or a second resource region according to a result of the detection of the second control information, and control the transceiver to transmit D2D data to the reception terminal through the D2D frame, wherein the D2D frame includes a contention period in which the first control information is transmitted and a D2D data period in which the D2D data is transmitted, wherein the contention period is located in front of the D2D data period, wherein the contention period includes at least one contention-based scheduling assignment period, wherein the at least one contention-based scheduling assignment period is allocated for the transmission terminal, wherein the at least one contention-based scheduling assignment period includes a sub-scheduling assignment period for transmitting the first control information, and wherein the at least one contention-based scheduling assignment period further includes at least one of a demodulation reference signal (DM-RS) period for transmitting a DM-RS, a response signal period for receiving a response signal in response to the first control information, or a scheduling assignment guard period.

15. The apparatus of claim 14, wherein the first control information includes information related to an identifier (ID) of the transmission terminal or a location of a D2D data resource region.

* * * * *